(12) United States Patent
Sun et al.

(10) Patent No.: US 12,389,010 B2
(45) Date of Patent: Aug. 12, 2025

(54) VIDEO TRANSMISSION METHOD AND DEVICE

(71) Applicant: HUAWEI TECHNOLOGIES CO., LTD., Guangdong (CN)

(72) Inventors: Long Sun, Shenzhen (CN); Wei Lu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 18/070,220

(22) Filed: Nov. 28, 2022

(65) Prior Publication Data

US 2023/0090985 A1 Mar. 23, 2023

Related U.S. Application Data

(63) Continuation of application No. PCT/CN2021/094581, filed on May 19, 2021.

(30) Foreign Application Priority Data

May 29, 2020 (CN) .......................... 202010480038.9

(51) Int. Cl.
*H04N 19/146* (2014.01)
*H04N 19/114* (2014.01)
(Continued)

(52) U.S. Cl.
CPC ......... *H04N 19/146* (2014.11); *H04N 19/114* (2014.11); *H04N 19/136* (2014.11);
(Continued)

(58) Field of Classification Search
CPC .... H04N 19/85; H04N 19/136; H04N 19/177; H04N 21/23439; H04N 19/172;
(Continued)

(56) References Cited

U.S. PATENT DOCUMENTS

2020/0374555 A1* 11/2020 Gao ..................... H04N 19/124
2022/0007039 A1* 1/2022 Gao ....................... H04N 19/30

FOREIGN PATENT DOCUMENTS

CN 103813174 A 5/2014

OTHER PUBLICATIONS

Jing, "Research on Video Super Resolution Technology Based on Convolutional Neural Network," Thesis for the degree of Master, University of Electronic Science and Technology, Apr. 2019, 227 pages (with English translation).

(Continued)

*Primary Examiner* — Tsion B Owens
(74) *Attorney, Agent, or Firm* — Fish & Richardson P.C.

(57) ABSTRACT

This application disclosed video transmission methods and devices. An example method includes obtaining a first video and a second video, where the first video and the second video have same content, and image quality of the first video is lower than image quality of the second video. M first video frames and identifier information of N target frames based on the first video are obtained. Related frames corresponding to the N target frames are obtained from the second video based on the identifier information of the N target frames, where the target frames and the related frames have same identifier information but different image quality. The M first video frames and the N related frames are recorded to obtain a third video, where the third video is transmitted to a receiving device, and a data volume of the third video is less than a data volume of the second video.

18 Claims, 13 Drawing Sheets

(51) Int. Cl.
*H04N 19/136* (2014.01)
*H04N 19/172* (2014.01)
*H04N 19/176* (2014.01)
*H04N 19/177* (2014.01)
*H04N 19/40* (2014.01)
*H04N 19/85* (2014.01)
*H04N 19/105* (2014.01)

(52) U.S. Cl.
CPC ......... *H04N 19/172* (2014.11); *H04N 19/176* (2014.11); *H04N 19/177* (2014.11); *H04N 19/40* (2014.11); *H04N 19/85* (2014.11); *H04N 19/105* (2014.11)

(58) Field of Classification Search
CPC ........ H04N 7/01; H04N 19/59; H04N 19/146; H04N 19/114; H04N 19/176; H04N 19/40; H04N 19/105; G06T 3/40
See application file for complete search history.

(56) References Cited

OTHER PUBLICATIONS

Shu, "Research on Hybrid Resolution Video Super-Resolution Technology Based on Convolutional Neural Network," Thesis for the degree of Master, University of Electronic Science and Technology, Mar. 2019, 192 pages (with English translation).
International Search Report and Written Opinion in International Appln. No. PCT/CN2021/094581, mailed on Aug. 6, 2021, 19 pages (with English translation).

* cited by examiner

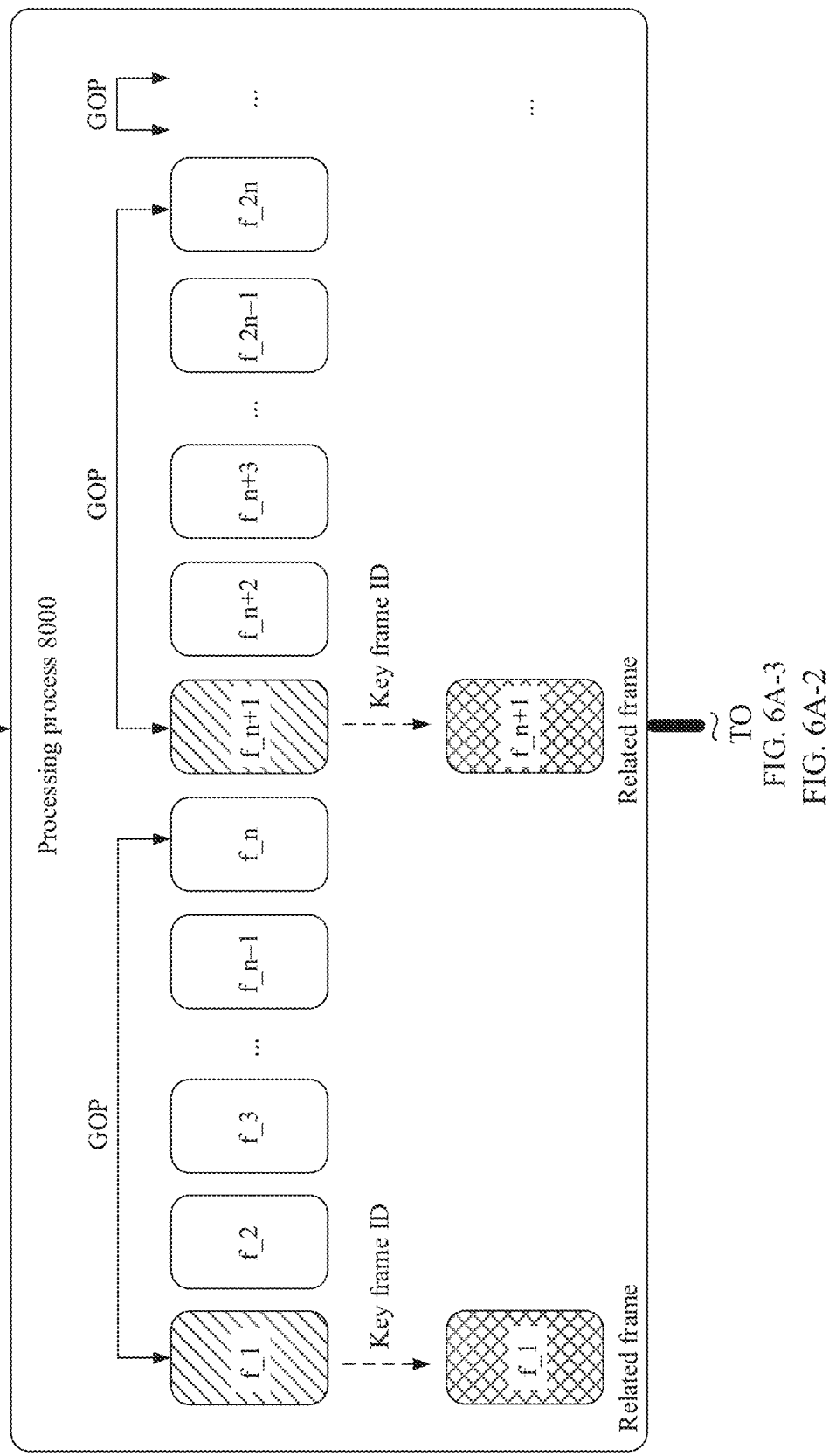

TO FIG. 7B

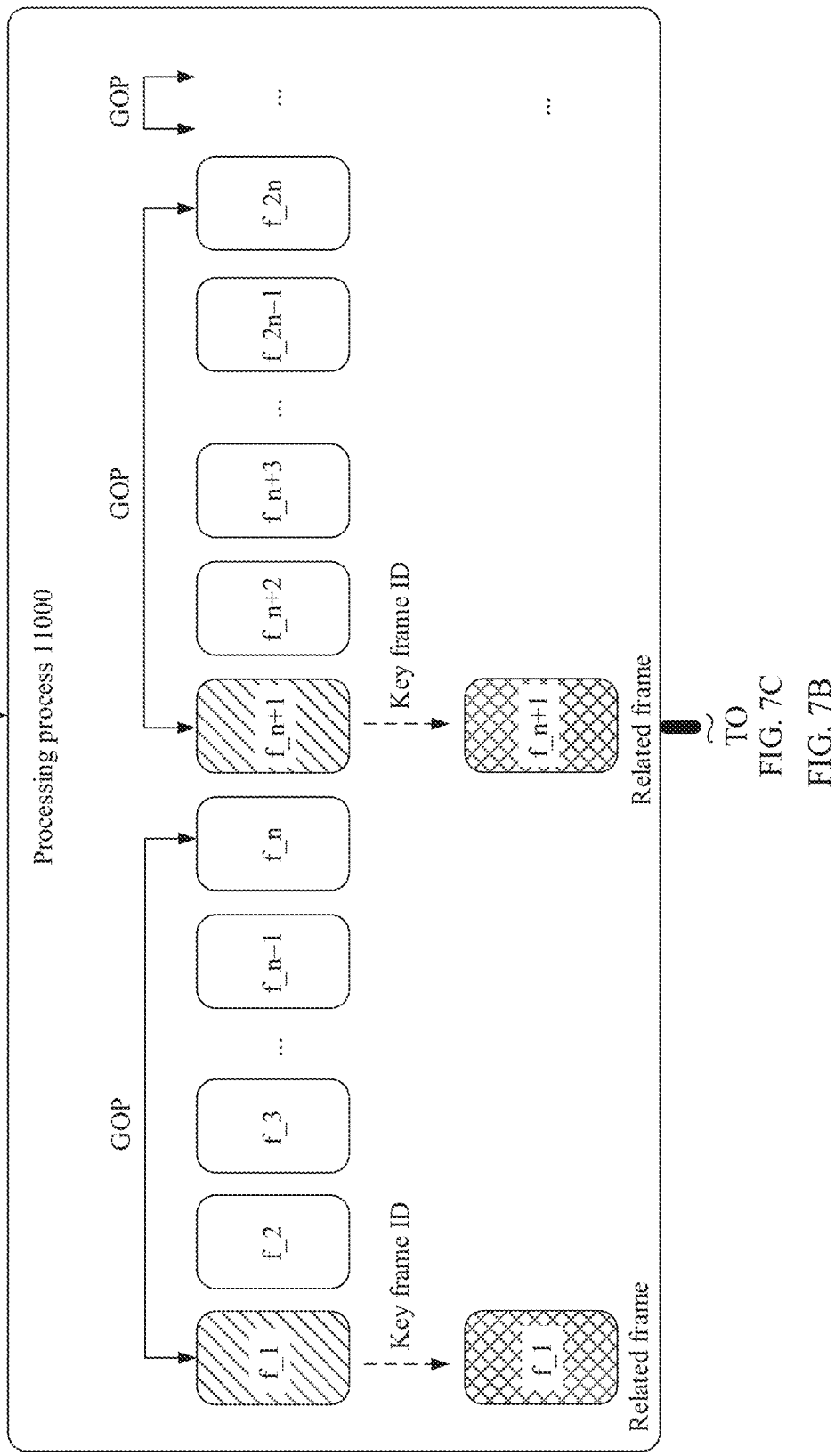

VIDEO TRANSMISSION METHOD AND DEVICE

CROSS-REFERENCE TO RELATED APPLICATIONS

This application is a continuation of International Application No. PCT/CN2021/094581, filed on May 19, 2021, which claims priority to Chinese Patent Application No. 202010480038.9, filed on May 29, 2020. The disclosures of the aforementioned applications are hereby incorporated by reference in their entireties.

TECHNICAL FIELD

Embodiments of this application relate to video processing technologies, and in particular, to a video transmission method and a device.

BACKGROUND

With continuous development of communication technologies, electronic devices such as a mobile phone, a tablet, and a smart television have become an indispensable part of people's daily life. With continuous popularization and upgrade of electronic devices and broadband and internet protocol (internet protocol, IP) development of communication networks, more multimedia services are applied to electronic devices, for example, services such as a short video, a streaming video, and a real-time video call. The multimedia services support video services with different rates and quality to meet service requirements of different users.

In a server that provides the foregoing multimedia services, video streams of different resolution exist for a same video, and the server may deliver the video streams according to selection of a user and/or a communication network condition of the user, that is, transmit the video streams to an electronic device used by the user.

However, when the server transmits a high-resolution video stream to the electronic device used by the user, to meet a requirement of the user for obtaining high resolution and high image quality, because a data volume of the high-resolution video stream is large, transmitting the high-resolution video stream imposes a high requirement on a communication network bandwidth of the electronic device used by the user. Due to limitations of a communication network bandwidth and a traffic balance of the electronic device used by the user, how to improve video image resolution and image quality while reducing a data volume of a transmitted video stream becomes an urgent problem to be resolved.

SUMMARY

Embodiments of this application provide a video transmission method and a device, which can improve video image resolution and image quality while reducing a data volume of a transmitted video.

According to a first aspect, an embodiment of this application provides a video transmission method. The method may include: A first video and a second video are obtained, where the first video and the second video have same content, and image quality of the first video is lower than image quality of the second video. M first video frames and identifier information of N target frames are obtained based on the first video, where the target frames are video frames in the first video frames, M and N are any positive integers, and M is greater than N. Related frames corresponding to the N target frames are obtained from the second video based on the identifier information of the N target frames, where the target frames and the related frames have same identifier information but different image quality. The M first video frames and the N related frames are recoded to obtain a third video, where the third video is transmitted to a receiving device, and a data volume of the third video is less than a data volume of the second video.

In this implementation, the related frames in the first video with low image quality and the second video with high image quality are recoded to obtain the third video. The data volume of the third video is less than the data volume of the second video all of which are high-quality video frames, so that a data volume of a transmitted video can be reduced.

The related frames in the second video with high image quality may be used by a receive end to perform texture transfer super-resolution processing on the first video frames with low image quality to obtain a super-resolution video, to improve video image resolution and image quality while reducing a data volume of a transmitted video.

The first aspect of embodiments of this application may be performed by a cloud server. By using the method in the first aspect, network downlink transmission pressure can be relieved, and video image quality of the receive end can be ensured.

In a possible design, the recoding the M first video frames and the N related frames may include: Each related frame of the N related frames is set at a tail of a plurality of first video frames associated with the related frame for encoding. The plurality of first video frames associated with the related frame include a plurality of first video frames associated with a target frame corresponding to the related frame.

In this implementation, a related frame is set at a tail of a plurality of first video frames, so that the receive end can use the related frame to perform texture transfer super-resolution processing on the plurality of first video frames, thereby improving video image resolution and image quality while reducing a data volume of a transmitted video.

In a possible design, the obtaining M first video frames and identifier information of N target frames based on the first video may include: The first video is decoded to obtain the M first video frames, where the M first video frames include K groups of pictures, and K is less than M. The identifier information of the N target frames is extracted from the M first video frames. Each group of pictures in the K groups of pictures includes at least one target frame, or a plurality of groups of pictures in the K groups of pictures include one target frame.

In this implementation, the target frames are extracted at a granularity of a group of pictures. One or more first video frames may be selected from one or more groups of pictures as the target frames, the identifier information of the target frames is extracted, and the related frames in the second video are obtained based on the identifier information of the target frames. In this way, the receive end can use the related frames to perform texture transfer super-resolution processing on the first video frames in the one or more groups of pictures, thereby improving video image resolution and image quality while reducing a data volume of a transmitted video.

In a possible design, the plurality of first video frames associated with the target frame corresponding to the related frame include a first video frame of at least one group of pictures corresponding to the target frame.

In a possible design, the setting each related frame of the N related frames at a tail of a plurality of first video frames associated with the related frame includes: A residual block corresponding to the related frame is determined based on the N related frames and the target frame corresponding to the related frame. The residual block corresponding to the related frame of the N related frames is set at the tail of the plurality of first video frames associated with the related frame.

In a possible design, the determining, based on the N related frames and the target frame corresponding to the related frame, a residual block corresponding to the related frame may include: Interpolation amplification is performed on the target frame corresponding to the related frame to obtain an enlarged image of the target frame, where resolution of the enlarged image is the same as resolution of the related frame. Residual processing is performed on the related frame and the enlarged image of the related frame, to determine the residual block corresponding to the related frame.

In a possible design, the target frame includes at least one of the following: an I frame, a P frame, or a B frame.

According to a second aspect, an embodiment of this application provides a video transmission method. The method may include: A first video is received. M first video frames and N related frames are obtained based on the first video, where M and N are any positive integers. M is greater than N, image quality of the first video frames is lower than image quality of the related frames, and the related frames correspond to target frames in the first video frames. A reference image of each first video frame is determined based on the N related frames. Texture transfer super-resolution processing is performed on each first video frame based on the reference image of the first video frame, to obtain a super-resolution video.

In a possible design, the super-resolution video includes a plurality of super-resolution video frames, and the performing texture transfer super-resolution processing on each first video frame based on the reference image of the first video frame may include: Each first video frame and the reference image of the first video frame are input into a texture transfer super-resolution neural network model, to output the super-resolution video frames corresponding to the first video frames. The texture transfer super-resolution neural network model is obtained by training a neural network model by using the first video frames and second video frames, the texture transfer super-resolution neural network model transfers texture feature information of the second video frames to the first video frames and performs super-resolution processing on the first video frames, and image quality of the second video frames is higher than that of the first video frames.

In a possible design, the M first video frames include K groups of pictures, K is less than M, and the determining a reference image of each first video frame based on the N related frames may include: A related frame of each group of pictures is used as a reference image of each first video frame in the group of pictures. The related frame of the group of pictures is a related frame corresponding to a target frame in the group of pictures.

In a possible design, the method may further include: The super-resolution video is rendered, and a rendered super-resolution video is displayed.

According to a third aspect, this application provides a video transmission apparatus. The video transmission apparatus may be a chip or a system on chip in a sending device, or may be a functional module that is in the sending device and that is configured to implement the method in any one of the first aspect or the possible designs of the first aspect. The video transmission apparatus may implement functions performed by the sending device in the first aspect or the possible designs of the first aspect, and the functions may be implemented by hardware by executing corresponding software. The hardware or the software includes one or more modules corresponding to the foregoing functions. For example, in a possible implementation, the video transmission apparatus may include an obtaining module, a related frame extraction module, and an encoding module. The obtaining module is configured to obtain a first video and a second video, where the first video and the second video have same content, and image quality of the first video is lower than image quality of the second video. The related frame extraction module is configured to obtain M first video frames and identifier information of N target frames based on the first video, where the target frames are video frames in the first video frames, M and N are any positive integers, and M is greater than N. The related frame extraction module is further configured to obtain, from the second video based on the identifier information of the N target frames, related frames corresponding to the N target frames, where the target frames and the related frames have same identifier information but different image quality. The encoding module is configured to recode the M first video frames and the N related frames to obtain a third video, where the third video is transmitted to a receiving device, and a data volume of the third video is less than a data volume of the second video.

In a possible design, the encoding module is configured to set each related frame of the N related frames at a tail of a plurality of first video frames associated with the related frame for encoding. The plurality of first video frames associated with the related frame include a plurality of first video frames associated with a target frame corresponding to the related frame.

In a possible design, the related frame extraction module is configured to decode the first video to obtain the M first video frames, where the M first video frames include K groups of pictures, and K is less than M; and extract the identifier information of the N target frames from the M first video frames. Each group of pictures in the K groups of pictures includes at least one target frame, or a plurality of groups of pictures in the K groups of pictures include one target frame.

In a possible design, the plurality of first video frames associated with the target frame corresponding to the related frame include a first video frame of at least one group of pictures corresponding to the target frame.

In a possible design, the encoding module is configured to determine, based on the N related frames and the target frame corresponding to the related frame, a residual block corresponding to the related frame; and set the residual block corresponding to the related frame of the N related frames at the tail of the plurality of first video frames associated with the related frame.

In a possible design, the encoding module is configured to perform interpolation amplification on the target frame corresponding to the related frame to obtain an enlarged image of the target frame, where resolution of the enlarged image is the same as resolution of the related frame; and perform residual processing on the related frame and the enlarged image of the related frame, to determine the residual block corresponding to the related frame.

In a possible design, the target frame includes at least one of the following: an I frame, a P frame, or a B frame.

According to a fourth aspect, this application provides a video transmission apparatus. The video transmission apparatus may be a chip or a system on chip in a receiving device, or may be a functional module that is in the receiving device and that is configured to implement the method in any one of the second aspect or the possible designs of the second aspect. The video transmission apparatus may implement functions performed by the receiving device in the second aspect or the possible designs of the second aspect, and the functions may be implemented by hardware by executing corresponding software. The hardware or the software includes one or more modules corresponding to the foregoing functions. For example, in a possible implementation, the video transmission apparatus may include a receiving module, a decoding module, and a super-resolution module. The receiving module is configured to receive a first video. The decoding module is configured to obtain M first video frames and N related frames based on the first video, where M and N are any positive integers. M is greater than N, image quality of the first video frames is lower than image quality of the related frames, and the related frames correspond to target frames in the first video frames. The decoding module is further configured to determine a reference image of each first video frame based on the N related frames. The super-resolution module is configured to perform texture transfer super-resolution processing on each first video frame based on the reference image of the first video frame, to obtain a super-resolution video.

In a possible design, the super-resolution video includes a plurality of super-resolution video frames. The super-resolution module is configured to input each first video frame and the reference image of the first video frame into a texture transfer super-resolution neural network model, to output the super-resolution video frames corresponding to the first video frames. The texture transfer super-resolution neural network model is obtained by training a neural network model by using the first video frames and second video frames, the texture transfer super-resolution neural network model transfers texture feature information of the second video frames to the first video frames and performs super-resolution processing on the first video frames, and image quality of the second video frames is higher than that of the first video frames.

In a possible design, the M first video frames include K groups of pictures, where K is less than M. The decoding module is configured to use a related frame of each group of pictures as a reference image of each first video frame in the group of pictures. The related frame of the group of pictures is a related frame corresponding to a target frame in the group of pictures.

In a possible design, the apparatus further includes: a rendering module, configured to render the super-resolution video, and display a rendered super-resolution video.

According to a fifth aspect, an embodiment of this application provides a video transmission apparatus, including: one or more processors; and a memory, configured to store one or more programs. When the one or more programs are executed by the one or more processors, the one or more processors are enabled to implement the method according to any one of the possible implementations of the first aspect.

The video transmission apparatus may be an encoder, or a chip or a system on chip of the encoder.

According to a sixth aspect, an embodiment of this application provides a video transmission apparatus, including: one or more processors; and a memory, configured to store one or more programs. When the one or more programs are executed by the one or more processors, the one or more processors are enabled to implement the method according to any one of the possible implementations of the second aspect.

The video transmission apparatus may be a decoder, or a chip or a system on chip of the decoder.

According to a seventh aspect, an embodiment of this application provides a computer-readable storage medium, including a computer program. When the computer program is executed on a computer, the computer is enabled to perform the method according to any one of the possible implementations of the first aspect.

According to an eighth aspect, an embodiment of this application provides a computer-readable storage medium, including a computer program. When the computer program is executed on a computer, the computer is enabled to perform the method according to any one of the possible implementations of the second aspect.

According to a ninth aspect, an embodiment of this application provides a sending device, including an encoder, where the encoder is configured to perform the method according to any one of the first aspect or the possible designs of the first aspect. Optionally, the sending device may further include a decoder, configured to decode a received video.

According to a tenth aspect, an embodiment of this application provides a receiving device, including a decoder, where the decoder is configured to perform the method according to any one of the second aspect or the possible designs of the second aspect. Optionally, the receiving device may further include an encoder, configured to encode a video.

According to an eleventh aspect, an embodiment of this application provides a computer program product. When the computer program product runs on a computer, the computer is enabled to perform some or all steps of any method in the first aspect, or the computer is enabled to perform some or all steps of any method in the second aspect.

It should be understood that, the technical solutions in the second aspect to the eleventh aspect of embodiments of this application are consistent with the technical solution in the first aspect of embodiments of this application. Beneficial effects achieved in the various aspects and corresponding feasible implementations are similar, and details are not described again.

It can be learned that the sending device in this embodiment of this application obtains the M first video frames and the identifier information of the N target frames based on the first video, where the target frames are video frames in the first video frames: obtains, from the second video based on the identifier information of the N target frames, related frames corresponding to the N target frames; and recodes the M first video frames and the N related frames to obtain a third video. Because the third video is obtained by encoding low-quality video frames and a small part of high-quality video frames, a data volume of the third video is less than a data volume of the second video all of which are high-quality video frames, and a data volume of a transmitted video can be reduced. The receiving device obtains M first video frames and N related frames based on the third video, determines a reference image of each first video frame based on the N related frames, and performs texture transfer super-resolution processing on each first video frame based on the reference image of the first video frame, to obtain a super-resolution video. The receiving device may improve image quality and resolution of the first video frames by using the related frames, to obtain the super-resolution video, thereby improving video image resolution and image quality while reducing a data volume of a transmitted video.

BRIEF DESCRIPTION OF DRAWINGS

FIG. 6A-1 to FIG. 6A-3 show a schematic diagram of a processing process of video recoding according to an embodiment of this application:

FIG. 7A to FIG. 7C show a schematic diagram of a processing process of texture transfer according to an embodiment of this application;

DESCRIPTION OF EMBODIMENTS

Figure 1:
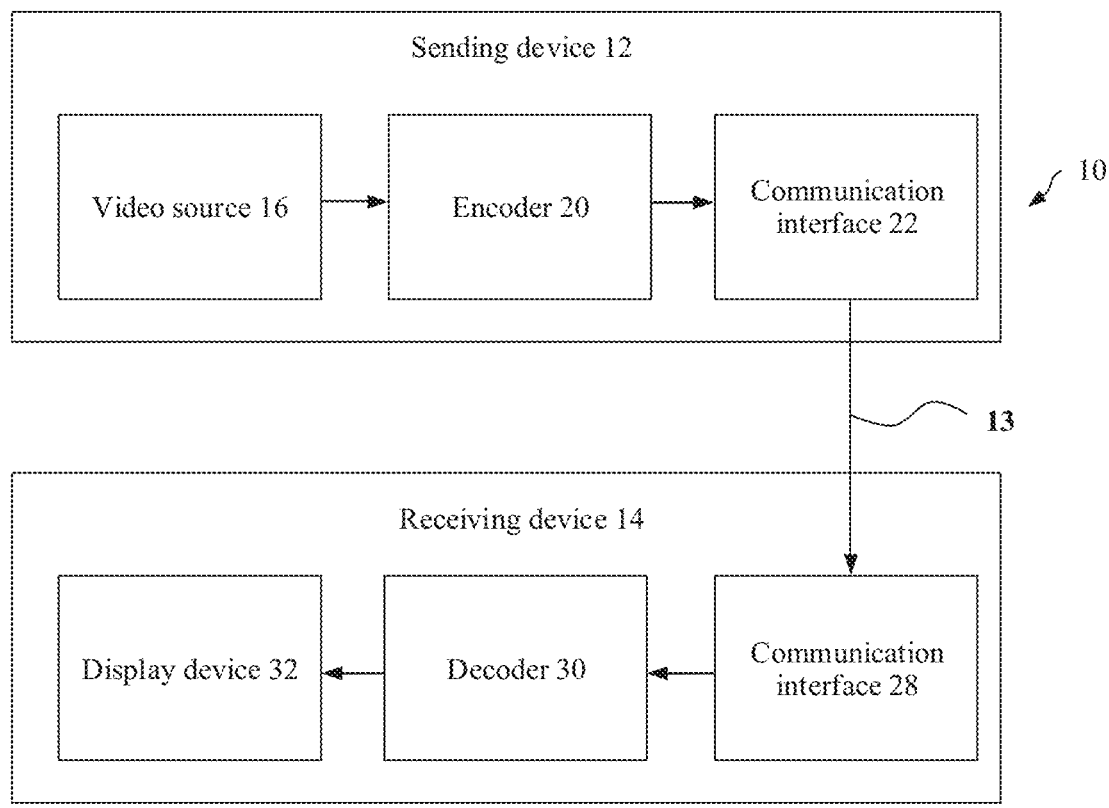
FIG. 1 is a schematic block diagram of a video transmission system 10 according to an embodiment of this application.

The terms such as "first" and "second" in embodiments of this application are merely used for distinguishing and description, and shall not be understood as an indication or implication of relative importance or an indication or implication of an order. In addition, the terms "include". "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices. In the descriptions of embodiments of this application, the word such as "example" or "for example" is used to represent giving an example, an illustration, or a description. Any embodiment or design scheme described as "example" or "for example" in embodiments of this application should not be explained as being more preferred or having more advantages than another embodiment or design scheme. Specifically, use of the word "example", "for example", or the like is intended to present a related concept in a specific manner.

It should be understood that, in embodiments of this application, "at least one" means one or more, and "a plurality of" means two or more. The term "and/or" is used to describe an association relationship between associated objects, and represents that three relationships may exist. For example, "A and/or B" may represent the following three cases: Only A exists, only B exists, and both A and B exist, where A and B may be singular or plural. The character "I" generally represents an "or" relationship between associated objects. "At least one of the following" or a similar expression thereof indicates any combination of the following, including any combination of one or more of the following. For example, at least one of a, b, or c may indicate a, b, c, "a and b", "a and c", "b and c", or "a, b, and c", where a, b, and c may be singular or plural.

Video encoding usually refers to processing a sequence of pictures forming a video (which may also be referred to as a video stream) or a video sequence. In the field of video processing, the terms "picture (picture)", "frame (frame)", and "image (image)" may be used as synonyms. Video encoding is performed on a sending side, and generally includes processing (for example, recoding) a low-quality video and a high-quality video to reduce a data volume required by a receiving side to obtain a high-quality video, to achieve more efficient storage and/or transmission. Video decoding is performed on the receiving side and generally includes inverse processing with respect to encoding to reconstruct video frames. A combination of an encoding part and a decoding part is also referred to as encoding and decoding (encoding and decoding).

Recoding in embodiments of this application means recoding at least one video frame (for example, a target frame) in a low-quality video and a high-quality video, to obtain a new video. The new video may be used by the receiving side to obtain a super-resolution video through super-resolution processing.

Super-resolution processing in embodiments of this application means improving resolution of an original image (for example, a low-quality video frame in embodiments of this application) by using a hardware or software method. Super-resolution processing is a process in which a high-resolution (High Resolution, HR) image is obtained from a series of low-resolution (Low Resolution, LR) images, and may also be referred to as super-resolution reconstruction.

Image quality in embodiments of this application is quality of images. The image quality may include one or more indicators such as clarity, acuteness, distortion, dispersion, resolution, color gamut, color purity (color), and color balance.

The following describes a system architecture to which embodiments of this application are applied. FIG. 1 is a schematic block diagram of an example of a video transmission system 10 to which an embodiment of this application is applied. As shown in FIG. 1, the video transmission system 10 may include a sending device 12 and a receiving device 14. The sending device 12 generates a recoded video (for example, the foregoing new video). The receiving device 14 may decode the recoded video generated by the sending device 12. In various implementation solutions, the sending device 12, the receiving device 14, or both the sending device 12, the receiving device 14 may include one or more processors and a memory coupled to the one or more processors. The memory may include but is not limited to a RAM, a ROM, an EEPROM, a flash memory, or any other medium that can store desired program code in a form of instructions or a data structure accessible by a computer, as described in this specification. The sending device 12 and the receiving device 14 may include various apparatuses, including a desktop computer, a mobile computing apparatus, a notebook (for example, a laptop) computer, a tablet computer, a set-top box, a telephone handset such as a so-called "smart" phone, a television set, a camera, a display apparatus, a digital media player, a video game console, a server, a vehicle-mounted computer, a wireless communication device, or the like.

Although FIG. 1 depicts the sending device 12 and the receiving device 14 as separate devices, a device embodiment may alternatively include both the sending device 12 and the receiving device 14 or functionalities of both the sending device 12 and the receiving device 14, that is, the sending device 12 or a corresponding functionality and the receiving device 14 or a corresponding functionality. In such an embodiment, the sending device 12 or the corresponding functionality and the receiving device 14 or the corresponding functionality may be implemented by using same hardware and/or software or by using separate hardware and/or software or any combination thereof.

The sending device 12 and the receiving device 14 may be communicatively connected through a link 13, and the receiving device 14 may receive the recoded video from the sending device 12 through the link 13. The link 13 may include one or more media or apparatuses capable of transferring the recoded video from the sending device 12 to the receiving device 14. In an example, the link 13 may include one or more communication media that enable the sending device 12 to directly transmit the recoded video to the receiving device 14 in real time. In such an example, the sending device 12 may modulate the recoded video according to a communication standard (for example, a wireless communication protocol), and may transmit a modulated video stream to the receiving device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the sending device 12 to the receiving device 14.

The sending device 12 includes an encoder 20. In addition, optionally, the sending device 12 may further include a video source 16 and a communication interface 22. In a specific implementation, the encoder 20, the video source 16, and the communication interface 22 may be hardware components in the sending device 12, or may be software programs in the sending device 12. Descriptions are as follows.

The video source 16 may be a camera for capturing a video or a memory for storing a video. The video source 16 may further include any type of (internal or external) interface for storing a previously captured or generated video and/or obtaining or receiving a video. When the video source 16 is a camera, the video source 16 may be, for example, a local camera or a camera integrated into the sending device. When the video source 16 is a memory, the video source 16 may be, for example, a local memory or a memory integrated into the sending device. When the video source 16 includes an interface, the interface may be, for example, an external interface for receiving a video from an external video source. The external video source is, for example, an external video capturing device, such as a camera, an external memory, or an external video generation device. The external video generation device is, for example, an external computer graphics processor, a computer, or a server. The interface may be any type of interface, for example, a wired or wireless interface or an optical interface, according to any proprietary or standardized interface protocol.

In this embodiment of this application, a video transmitted by the video source 16 to the encoder 20 may include a high-quality video and a low-quality video.

The encoder 20 (or referred to as a video encoder 20) is configured to receive a high-quality video and a low-quality video, and process the high-quality video and the low-quality video in a manner in the following embodiment, to provide a recoded video (structural details of the encoder 20 are further described below with reference to FIG. 2 or FIG. 3). In some embodiments, the encoder 20 may be configured to perform various embodiments described below, to implement application of the video transmission method described in this application to an encoder side.

The communication interface 22 may be configured to receive the recoded video, and transmit the recoded video to the receiving device 14 or any other device (for example, a memory) through the link 13, for storage or direct reconstruction. The other device may be any device for decoding or storage. The communication interface 22 may be, for example, configured to encapsulate the recoded video into an appropriate format, for example, a data packet, for transmission through the link 13.

The receiving device 14 includes a decoder 30. In addition, optionally, the receiving device 14 may further include a communication interface 28 and a display device 32. Descriptions are as follows.

The communication interface 28 may be configured to receive the recoded video from the sending device 12 or any other source. Any other source is, for example, a storage device. The storage device is, for example, a recoded video storage device. The communication interface 28 may be configured to transmit or receive the recoded video through the link 13 between the sending device 12 and the receiving device 14 or through any type of network. The link 13 is, for example, a direct wired or wireless connection. Any type of network is, for example, a wired or wireless network or any combination thereof, or any type of private or public network, or any combination thereof. The communication interface 28 may be, for example, configured to decapsulate the data packet transmitted through the communication interface 22, to obtain the recoded video.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as recoded video transmission.

The decoder 30 (or referred to as a decoder 30) is configured to receive the recoded video, and perform super-resolution processing to provide a super-resolution video (structural details of the decoder 30 are further described below with reference to FIG. 2 or FIG. 3). In some embodiments, the decoder 30 may be configured to perform various embodiments described below, to implement application of the video transmission method described in this application to a decoder side.

The display device 32 is configured to receive the super-resolution video to display images to, for example, a user or a viewer. The display device 34 may be or may include any type of display for presenting a reconstructed picture, for example, an integrated or external display or monitor. For example, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any type of other display.

Although FIG. 1 depicts the sending device 12 and the receiving device 14 as separate devices, a device embodiment may alternatively include both the sending device 12 and the receiving device 14 or functionalities of both the sending device 12 and the receiving device 14, that is, the sending device 12 or a corresponding functionality and the receiving device 14 or a corresponding functionality. In such an embodiment, the sending device 12 or the corresponding functionality and the receiving device 14 or the corresponding functionality may be implemented by using same hardware and/or software or by using separate hardware and/or software or any combination thereof.

As will be apparent for a person skilled in the art based on the descriptions, existence and (exact) split of functionalities of the different units or functionalities of the sending device 12 and/or the receiving device 14 shown in FIG. 1 may vary depending on an actual device and application. The sending device 12 and the receiving device 14 may be any one of a wide range of devices, including any type of handheld or stationary device, for example, a notebook or laptop computer, a mobile phone, a smartphone, a pad or a tablet computer, a video camera, a desktop computer, a set-top box, a television set, a camera, a vehicle-mounted device, a display, a digital media player, a video game console, a video streaming transmission device (such as a content service server or a content distribution server), a broadcast receiver device, or a broadcast transmitter device, and may not use or may use any type of operating system.

The encoder 20 and the decoder 30 each may be implemented as any one of various appropriate circuits, for example, one or more microprocessors, digital signal processors (digital signal processor, DSP), application-specific integrated circuits (application-specific integrated circuit, ASIC), field-programmable gate arrays (field-programmable gate array, FPGA), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the video transmission system 10 shown in FIG. 1 is merely an example, and the technologies of this application are applicable to video encoding settings (for example, video encoding or video decoding) that do not necessarily include any data communication between an encoding device and a decoding device. In another example, data may be retrieved from a local memory, transmitted in a streaming manner through a network, or the like. A video encoding device may encode data and store data into the memory, and/or a video decoding device may retrieve and decode data from the memory. In some examples, the encoding and the decoding are performed by devices that do not communicate with one another, but simply encode data to the memory and/or retrieve and decode data from the memory.

Figure 2:
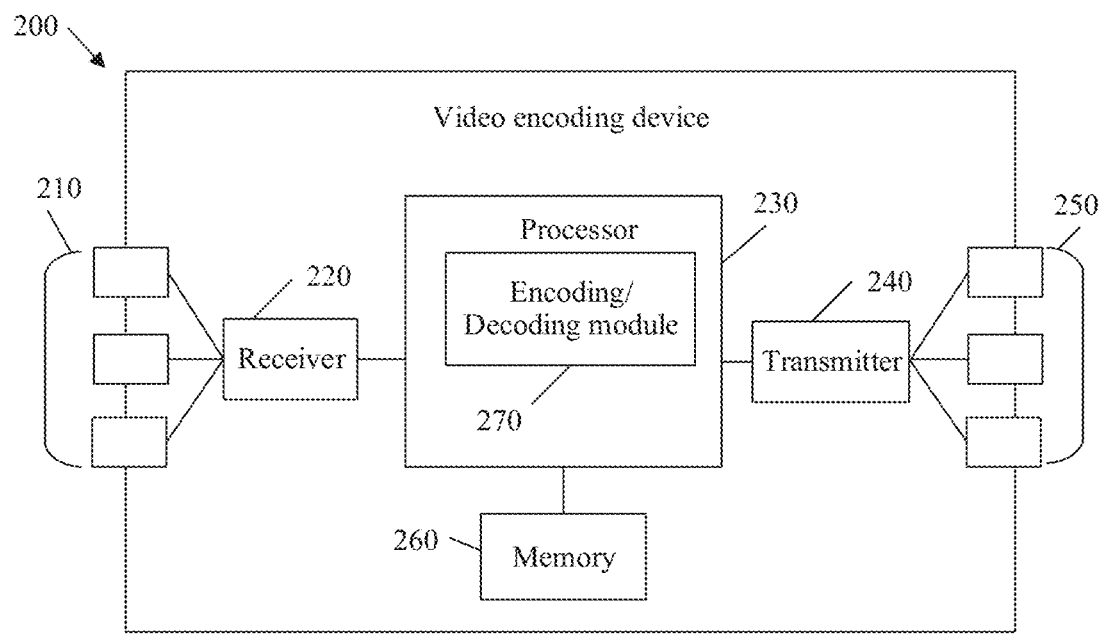
FIG. 2 is a schematic diagram of a structure of an example of a video coding device 200 according to an embodiment of this application.

FIG. 2 is a schematic diagram of a structure of a video coding device 200 (for example, a video encoding device 200 or a video decoding device 200) according to an embodiment of this application. The video coding device 200 is suitable for implementing embodiments described in this specification. In an embodiment, the video coding device 200 may be a video decoder (for example, the decoder 30 in FIG. 1) or a video encoder (for example, the encoder 20 in FIG. 1). In another embodiment, the video coding device 200 may be one or more components of the decoder 30 in FIG. 1 or the encoder 20 in FIG. 1.

The video coding device 200 includes an ingress port 210 and a receiver unit (Rx) 220 for receiving data, a processor, a logic unit, or a central processing unit (CPU) 230 for processing the data, a transmitter unit (Tx) 240 and an egress port 250 for transmitting the data, and a memory 260 for storing the data. The video coding device 200 may further include optical-to-electrical conversion components and electrical-to-optical (EO) components coupled to the ingress port 210, the receiver unit 220, the transmitter unit 240, and the egress port 250 for egress or ingress of optical or electrical signals.

The processor 230 is implemented by hardware and software. The processor 230 may be implemented as one or more CPU chips, cores (for example, a multi-core processor), FPGAs. ASICs, and DSPs. The processor 230 is in communication with the ingress port 210, the receiver unit 220, the transmitter unit 240, the egress port 250, and the memory 260. The processor 230 includes a coding module 270 (for example, an encoding module 270 or a decoding module 270). The encoding/decoding module 270 implements embodiments disclosed in this specification, to implement the video transmission method provided in embodiments of this application. For example, the encoding/decoding module 270 implements, processes, or provides various encoding operations. Therefore, the encoding/decoding module 270 provides a substantial improvement to functions of the video coding device 200 and affects a switching of the video coding device 200 to a different state. Alternatively, the encoding/decoding module 270 is implemented as instructions stored in the memory 260 and executed by the processor 230.

The memory 260 includes one or more disks, tape drives, and solid-state drives and may be used as an over-flow data storage device to store programs when such programs are selectively executed, and to store instructions and data that are read during program execution. The memory 460 may be volatile and/or non-volatile, and may be a read-only memory (ROM), a random access memory (RAM), a random access memory (ternary content-addressable memory, TCAM), and/or a static random access memory (SRAM).

Figure 3:
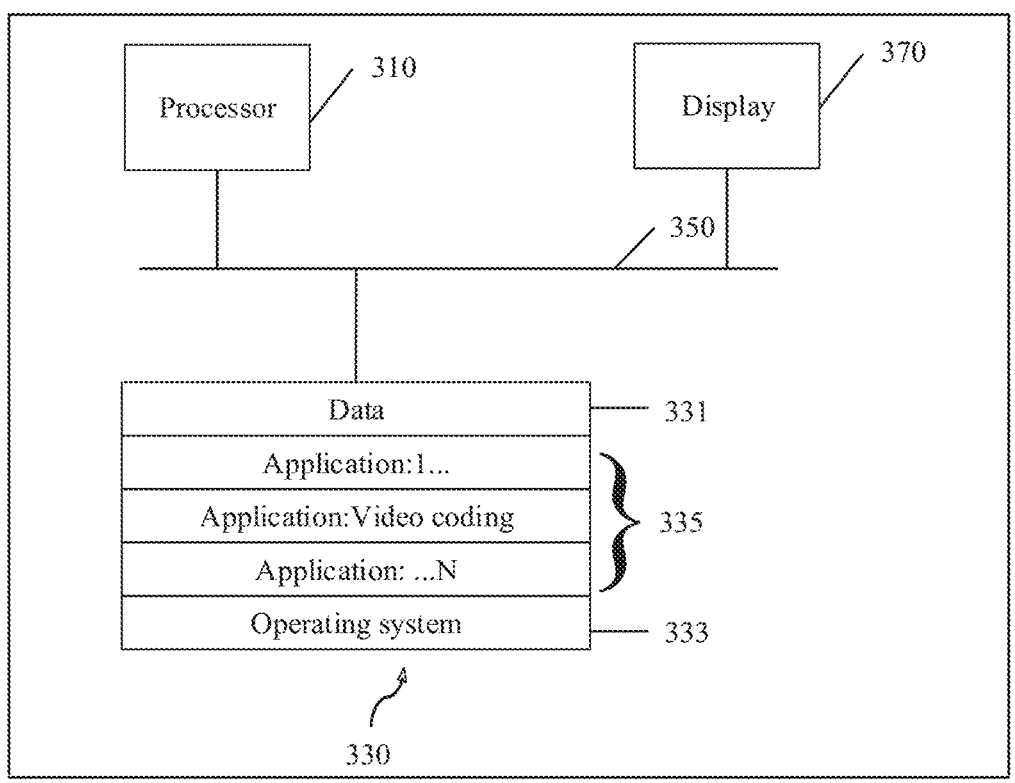
FIG. 3 is a schematic block diagram of another encoding apparatus or decoding apparatus according to an embodiment of this application.

FIG. 3 is a simplified block diagram of an apparatus 300 that may be used as either or both of the sending device 12 and the receiving device 14 in FIG. 1 according to an example embodiment. The apparatus 300 can implement technologies of this application. In other words, FIG. 3 is a schematic block diagram of an implementation of an encoding device or a decoding device (briefly referred to as a coding device 300) according to an embodiment of this application. The coding device 300 may include a processor 310, a memory 330, and a bus system 350. The processor and the memory are connected through the bus system, the memory is configured to store instructions, and the processor is configured to execute the instructions stored in the memory. The memory of the coding device stores program code, and the processor may invoke the program code stored in the memory to perform various video transmission methods described in this application. To avoid repetition, details are not described herein again.

In this embodiment of this application, the processor 310 may be a central processing unit (Central Processing Unit, "CPU" for short), or the processor 310 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 330 may include a read-only memory (ROM) device or a random access memory (RAM) device. Any other proper type of storage device may also be used as the memory 330. The memory 330 may include code and data 331 that are accessed by the processor 310 through the bus system 350. The memory 330 may further include an operating system 333 and an application 335. The application 335 includes at least one program that enables the processor 310 to perform the video transmission method described in this application. For example, the application 335 may include applications 1 to N, and further include a video recoding or decoding application (a video coding application for short) that performs the video transmission method described in this application.

In addition to a data bus, the bus system 350 may further include a power bus, a control bus, a status signal bus, and the like. However, for clear description, various types of buses in the figure are marked as the bus system 350.

Optionally, the coding device 3(k) may further include one or more output devices, for example, a display 370. In an example, the display 370 may be a touch display that combines a display and a touch unit that can operationally sense touch input. The display 370 may be connected to the processor 310 through the bus system 350.

According to the video transmission method in this embodiment of this application, at least one video frame of a low-quality video and a high-quality video may be recoded on a sending device side, to obtain a new video. A data volume of the new video is less than a data volume of the high-quality video, so that a data volume of video transmission can be reduced. Super-resolution processing may be performed on the low-quality video based on the new video on a receiving device side, to provide a super-resolution video. Therefore, higher image quality and higher resolution can be obtained on the receiving device side while a volume of data transmitted is less than that of the high-quality video, and this feature improves user experience. The video transmission method in this embodiment of this application can improve video image resolution and image quality while reducing a data volume of a transmitted video.

Compared with a manner of processing a low-resolution picture by using a video super-resolution algorithm (such as an ESPCN), the video transmission method in this embodiment of this application can improve image quality and resolution of the obtained super-resolution video by using high-quality video frames as reference images and performing texture transfer super-resolution processing. The manner of processing the low-resolution picture by using the video super-resolution algorithm (such as an ESPCN) depends only on super-resolution processing of the low-quality video. Lost information in the low-resolution picture cannot be additionally generated or supplemented in this manner. Therefore, the manner of processing the low-resolution picture by using the video super-resolution algorithm (such as an ESPCN) leads to poor effect of an obtained high-resolution image restored after super-resolution processing.

Compared with a manner in which a cloud directly performs super-resolution on a video and delivers a super-resolution result to a terminal, the video transmission method in this embodiment of this application can effectively reduce a data volume of video transmission, guarantee a super-resolution processing effect on the receiving device side, and guarantee image quality and resolution of the super-resolution video.

It should be noted that the sending device and the receiving device in embodiments of this application may be any one of the foregoing devices, for example, a server, a notebook computer or a laptop computer, a mobile phone, a smartphone, a pad, or a tablet computer. For ease of description, an example in which the sending device is a server and the receiving device is a smartphone is described in the following embodiments of this application, and this is not limited thereto.

The following uses specific embodiments to describe the video transmission method in this application.

Figure 4:
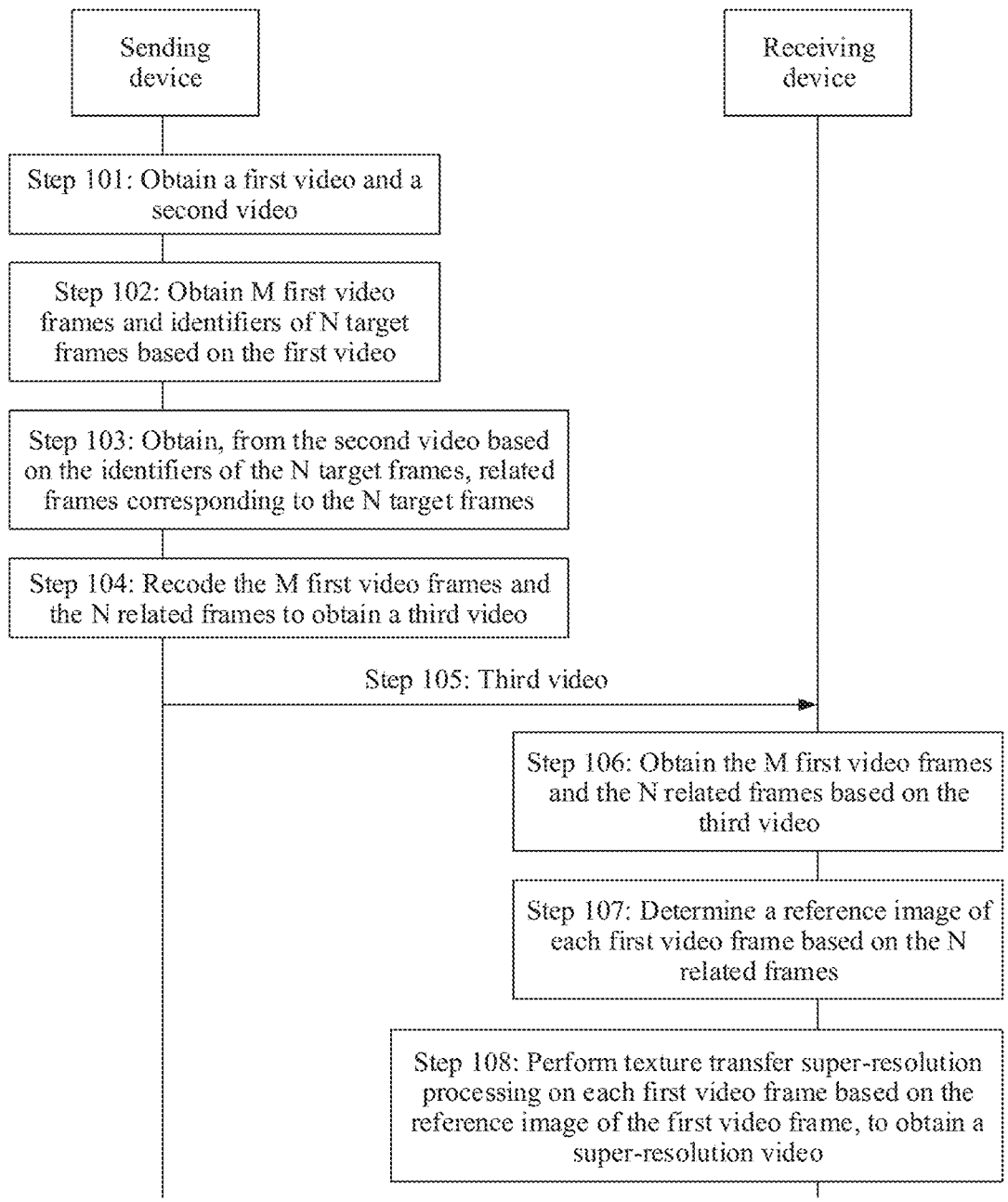
FIG. 4 is a flowchart of a video transmission method according to an embodiment of this application.

FIG. 4 is a flowchart of a video transmission method according to an embodiment of this application. This embodiment of this application relates to a sending device and a receiving device. As shown in FIG. 4, the method in this embodiment of this application may include the following steps:

Step 101: A sending device obtains a first video and a second video.

The first video and the second video have same content, and image quality of the first video is lower than image quality of the second video. In this embodiment of this application, the first video is the low-quality video, and the second video is the high-quality video. The first video and the second video may be video streams with same video content but different image quality, for example, a 360P video stream (a first video) and a 1080P video stream (a second video) of a first episode of a TV series A.

The sending device may receive the first video and the second video from another device, or may obtain the first video and the second video from a memory of the sending device.

Step 102: The sending device obtains M first video frames and identifier information of N target frames based on the first video, where the target frames are video frames in the first video frames, M and N are any positive integers, and M is greater than N.

The sending device may decode the first video to obtain the M first video frames, and the sending device may extract the identifier information of the N target frames in the M first video frames. The target frame may include at least one of the following: an I frame, a P frame, or a B frame. For example, in some embodiments, the target frame may be an I frame. In other words, the sending device may extract the identifier information of N key frames in the M first video frames. In some other embodiments, the target frame may be an I frame and a P frame. In other words, the sending device may extract I frames and some P frames from the M first video frames, and a total quantity of the I frames and the P frames is N.

The I frame, the P frame, and the B frame are described as follows: The I frame is also referred to as an intra-coded picture (antra-coded picture). The I frame is a key frame, is an independent frame with all information, and can be decoded independently without referring to other images. The I frame is also referred to as an intra picture (intra picture). The I frame is usually a first frame of each group of pictures. The P frame is also referred to as a predictive-coded picture (Predictive-coded Picture) and needs to be encoded based on a previous frame. The B frame is also referred to as a bidirectionally predicted picture (Bidirectionally predicted picture). The B frame is a bidirectional differential frame. The B frame is used to record a difference between a current frame and a previous/next frame. In other words, to decode the B frame, both a previously buffered picture and a decoded picture need to be obtained. A final picture can be obtained by combining a previous picture, a subsequent picture, and data of the frame.

Optionally, the sending device may extract the target frames at a granularity of a group of pictures (Group of pictures, GOP). For example, the M first video frames include K groups of pictures, and the sending device may select one or more first video frames from each group of pictures as the target frames, and extract the identifier information of the target frames. For example, the sending device may select an I frame and two P frames from each group of pictures as the target frames of the group of pictures. For another example, the M first video frames include K groups of pictures, and the sending device may select one or more first video frames from a plurality of groups of pictures as the target frames, and extract the identifier information of the target frames. For example, the sending device may select an I frame of a first group of pictures from two adjacent groups of pictures as the target frame of the two adjacent groups of pictures. K is less than M.

In some embodiments, the sending device may further select the N target frames based on content of the M first video frames, and extract the identifier information of the N target frames. For example, the target frames are flexibly selected based on content similarities between different first video frames.

Step 103: The sending device obtains, from the second video based on the identifier information of the N target frames, related frames corresponding to the N target frames, where the target frames and the related frames have same identifier information but different image quality.

The sending device extracts, from the second video based on the identifier information of the N target frames, second video frames (high-quality video frames) with the same identifier information, that is, extracts related frames (high-quality video frames) corresponding to the N target frames (low-quality video frames).

Step 104: The sending device recodes the M first video frames and the N related frames to obtain a third video.

The third video is transmitted to the receiving device, and a data volume of the third video is less than a data volume of the second video.

The sending device encodes the M first video frames (low-quality video frames) and the N related frames (high-quality video frames) to obtain the third video.

For example, the sending device may set each related frame of the N related frames at a tail of a plurality of first video frames associated with the related frame for encoding. The plurality of first video frames associated with the related frame include a plurality of first video frames associated with a target frame corresponding to the related frame. For example, if the target frame is an I frame, the plurality of first video frames associated with the target frame corresponding to the related frame include each first video frame of a group of pictures in which the I frame corresponding to the related frame is located.

Because the third video is obtained by encoding a large part of low-quality video frames and a small part of high-quality video frames, a data volume of the third video is less than a data volume of the second video (all of which are high-quality video frames).

Step 105: The sending device sends the third video to the receiving device.

Correspondingly, the receiving device receives the third video sent by the sending device.

Step 106: The receiving device obtains the M first video frames and the N related frames based on the third video.

The receiving device may decode the third video to obtain the M first video frames and the N related frames. It can be learned from the foregoing processing process of the sending device that image quality of the first video frames is lower than image quality of the related frames, and the related frames correspond to target frames in the first video frames.

For descriptions of the target frame, refer to the descriptions in step 102. Details are not described herein again.

Step 107: The receiving device determines a reference image of each first video frame based on the N related frames.

The receiving device may use, based on content similarities between the related frames and the first video frames, a related frame with a higher similarity as the reference image of the first video frame.

For example, the target frame corresponding to the related frame is an I frame, and the related frame may be used as a reference image of each first video frame in a group of pictures in which the I frame is located.

Step 108: The receiving device performs texture transfer super-resolution processing on each first video frame based on the reference image of the first video frame, to obtain a super-resolution video.

The receiving device may transfer similar texture between the reference images of the first video frames and the first video frames to the first video frames through texture transfer super-resolution processing, and obtain super-resolution video frames corresponding to the first video frames, to obtain the super-resolution video. Image quality of the super-resolution video is higher than that of the first video, and is similar to that of the second video. That is, a high-resolution (High Resolution, HR) image (a super-resolution video frame) is obtained by using a low-resolution (Low Resolution, LR) image (a first video frame).

There may be many specific implementations of the foregoing texture transfer super-resolution processing. For example, the texture transfer super-resolution processing is implemented by using a neural network model (a texture transfer super-resolution neural network model), to output the super-resolution video. The neural network model may be any neural network model, for example, a deep neural network (Deep Neural Network, DNN), a convolutional neural network (Convolutional Neural Network, CNN), or a combination thereof.

In some embodiments, the receiving device may further render the super-resolution video, and then display the super-resolution video on a display screen.

In this embodiment, the sending device obtains the M first video frames and the identifier information of the N target frames based on the first video, where the target frames are video frames in the first video frames; obtains, from the second video based on the identifier information of the N target frames, related frames corresponding to the N target frames; and recodes the M first video frames and the N related frames to obtain a third video. Because the third video is obtained by encoding low-quality video frames and a small part of high-quality video frames, a data volume of the third video is less than a data volume of the second video all of which are high-quality video frames, and a data volume of a transmitted video can be reduced. The receiving device obtains M first video frames and N related frames based on the third video, determines a reference image of each first video frame based on the N related frames, and performs texture transfer super-resolution processing on each first video frame based on the reference image of the first video frame, to obtain a super-resolution video. The receiving device may improve image quality and resolution of the first video frames by using the related frames, to obtain the super-resolution video, thereby improving video image resolution and image quality while reducing a data volume of a transmitted video.

When the sending device is a cloud server, and the receiving device is any terminal device connected to the cloud server, the cloud server recodes at least one video frame of the first video and at least one video frame of the second video, and sends a recoded video to the terminal device. The terminal device performs super-resolution processing on the recoded video, to obtain the super-resolution video. The method in this embodiment of this application can relieve network transmission pressure and guarantee video image quality of the terminal device.

Figure 5:
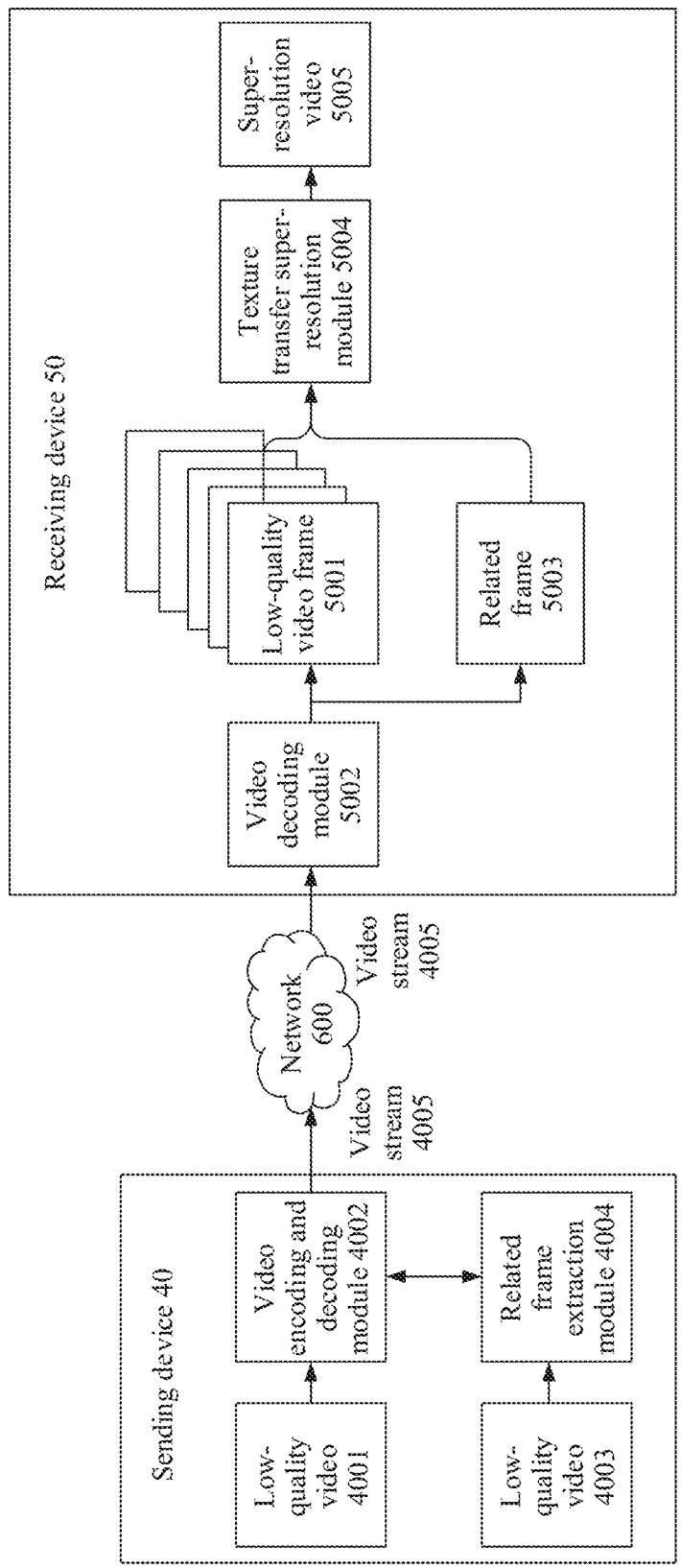
FIG. 5 is a schematic diagram of a processing process of a video transmission method according to an embodiment of this application.

With reference to FIG. 5, the following describes the method in the embodiment shown in FIG. 4 by using a specific example.

FIG. 5 is a schematic diagram of a processing process of a video transmission method according to an embodiment of this application. As shown in FIG. 5, a sending device 40 and a receiving device 50 are included. The sending device 40 may include a video encoding and decoding module 4002 and a related frame extraction module 4004. The receiving device 50 may include a video decoding module 5002 and a texture transfer super-resolution module 5004.

As shown in FIG. 5, when the sending device needs to send a high-quality video to the receiving device, for example, the sending device receives a video request message sent by the receiving device, where the video request message requests the sending device to send the high-quality video (for example, a 1080P video), the sending device may transmit the video by using the following processing process, to respond to the video request message. This meets a video image quality requirement of a user while reducing a data volume of a transmitted video.

Specifically, the sending device may obtain a high-quality video 4003 requested to be sent and a low-quality video 4001 whose content is the same as that of the high-quality video, and transmit the low-quality video 4001 to the video encoding and decoding module 4002. The video encoding and decoding module 4002 decodes the low-quality video 4001 to obtain low-quality video frames (for example, the M low-quality video frames). The video encoding and decoding module 4002 extracts IDs of N target frames in the M low-quality video frames and transmits the IDs of the N target frames to the related frame extraction module 4004. The related frame extraction module 4004 extracts, from the high-quality video 4003 based on the IDs of the N target frames, related frames corresponding to the N target frames. The related frame extraction module 4004 transmits the N related frames to the video encoding and decoding module 4002. The video encoding and decoding module 4002 encodes the M low-quality video frames and the N related frames to obtain a video stream 4005 (for example, the third video). The sending device sends the video stream 4005 to the receiving device through a network 600. The video decoding module 5002 of the receiving device decodes the video stream 4005 to obtain M low-quality video frames 5001 and N related frames 5003. The video decoding module 5002 transmits the M low-quality video frames 5001 and the N related frames 5003 to a texture transfer super-resolution (Super-Resolution, SR) module 5004. The texture transfer super-resolution (Super-Resolution, SR) module 5004 performs texture transfer super-resolution processing on the M low-quality video frames 5001 and the N related frames 5003 to obtain M super-resolution video frames, namely, a super-resolution video 5005, and outputs the super-resolution video 5005.

Figures 1, 6A:
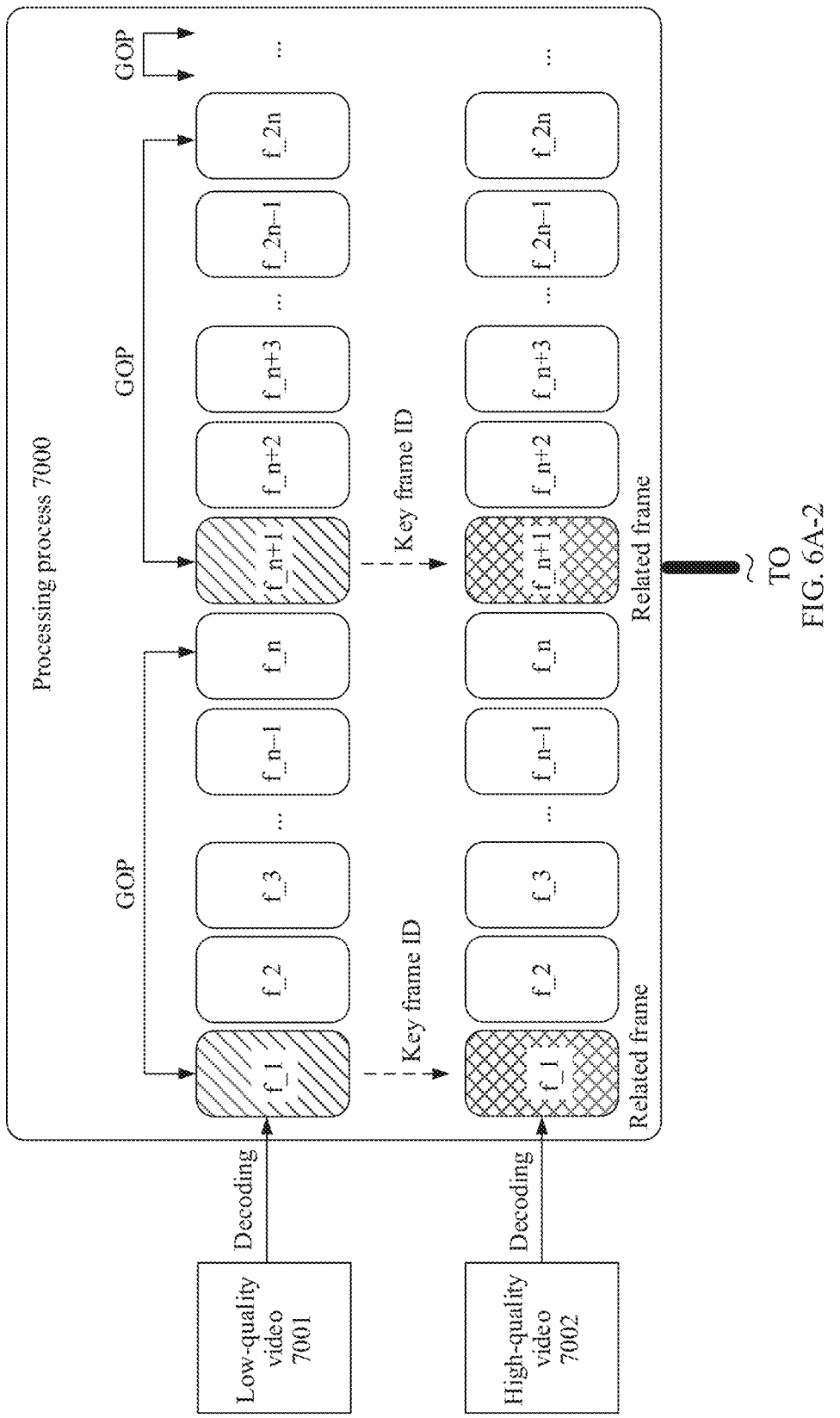
Figures 3, 6A:
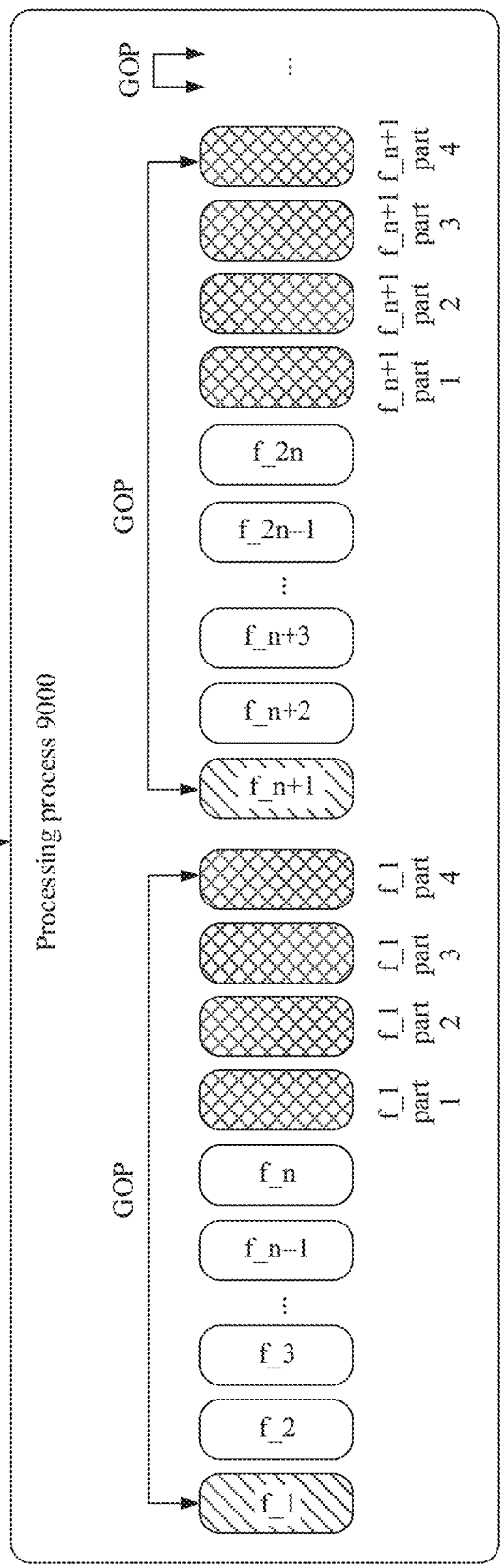

With reference to FIG. 6A-1 to FIG. 6A-3, the following describes step 102 to step 104 in the embodiment shown in FIG. 4 by using a specific example, to be specific, describes a recoding process on a sending device side.

FIG. 6A-1 to FIG. 6A-3 show a schematic diagram of a processing process of video recoding according to an embodiment of this application. As shown in FIG. 6A-1 to FIG. 6A 3, this embodiment is described by using an example in which a target frame is a key frame of each group of pictures. Refer to a processing process 7000 shown in FIG. 6A-1. The sending device may decode a low-quality video 7001 to obtain low-quality video frames of each group of pictures, for example, f_1, f_2, f_3, . . . , and f_n, f_n+1, f_n+2, f_n+3, . . . , and f_2n, and the like shown in FIG. 6A-1. The sending device may decode a high-quality video 7002 to obtain high-quality video frames of each group of pictures, for example, f_1, f_2, f_3, . . . , and f_n, f_n+1, f_n+2, f_n+3, . . . , and f_2n, and the like shown in FIG. 6A-l. Refer to a processing process 8000. The sending device extracts related frames corresponding to key frames from the high-quality video frames based on IDs of the key frames. Refer to a processing process 9000. The sending device may determine, based on the related frames and the key frames, residual blocks corresponding to the related frames. Four residual blocks obtained through two fold super-resolution processing are used as an example: f_1 part (part) 1, f_1 part (part) 2, f_1 part (part) 3, and f_1 part (pan) 4, as shown in FIG. 6A-3. The sending device may set f_1 part (part) 1, f_1 part (part) 2, f_1 part (part) 3, and f_1 part (part) 4 at a tail of the group of pictures in which the key frame corresponding to the related frame is located. In other words, the residual blocks are set into the group of pictures in which the corresponding key frame is located for recoding, to obtain the third video.

Figure 6B:
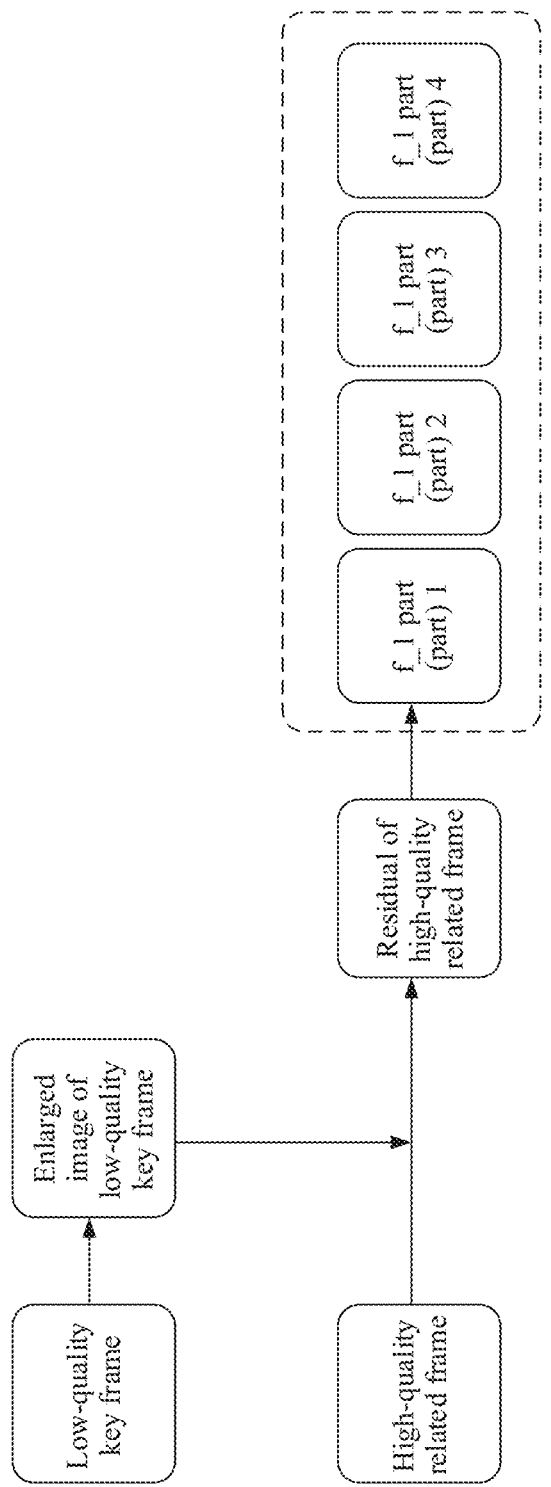
FIG. 6B is a schematic diagram of a processing process of a related frame according to an embodiment of this application.

FIG. 6B is a schematic diagram of a processing process of a related frame according to an embodiment of this application. A specific implementation of determining the residual blocks in the foregoing embodiment is described in FIG. 6B. As shown in FIG. 6B, a related frame (which may also be referred to as a high-quality related frame) and a key frame (which may also be referred to as a low-quality key frame) corresponding to the related frame are described as an example. The sending device may perform interpolation amplification, for example, bicubic (bicubic) interpolation amplification, on the low-quality key frame to obtain an enlarged image of the low-quality key frame, where resolution of the enlarged image of the low-quality key frame is the same as resolution of the high-quality related frame. The sending device performs residual processing on the enlarged image of the low-quality key frame and the high-quality related frame to obtain a high-quality related frame residual, and divides the high-quality related frame residual into four blocks: f_1 part (part) 1, f_1 part (part) 2, f_1 part (part) 3, and f_1 part (part) 4. Other related frames may be processed in a same manner. Details are not described one by one in this embodiment of this application.

It should be noted that the four residual blocks obtained through two-fold super-resolution processing are used as an example. Alternatively, the residual blocks may be nine residual blocks obtained through triple super-resolution processing, sixteen residual blocks obtained through quadruple super-resolution processing, or the like. Details are not described one by one in this embodiment of this application.

Figure 7A:
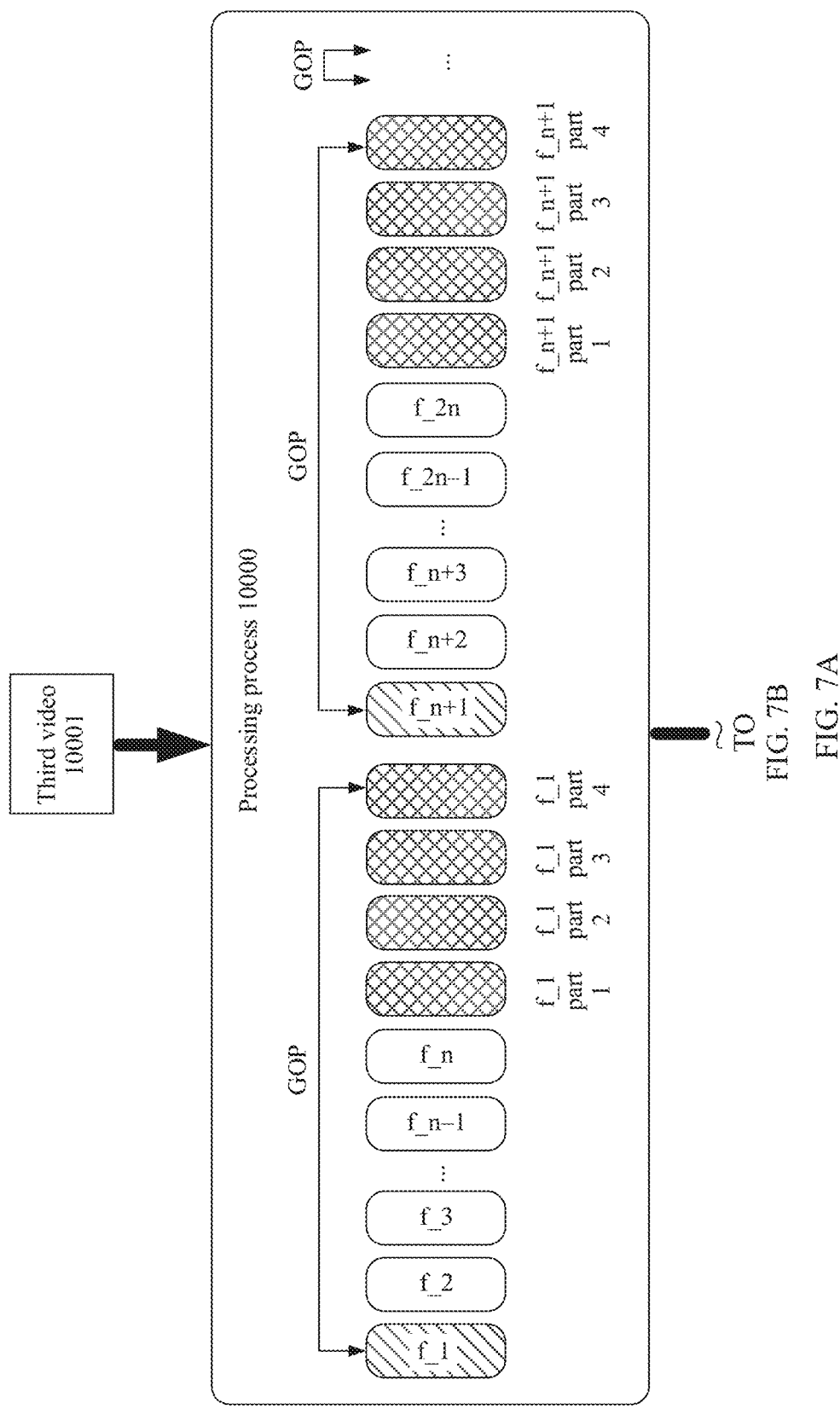
Figure 7C:
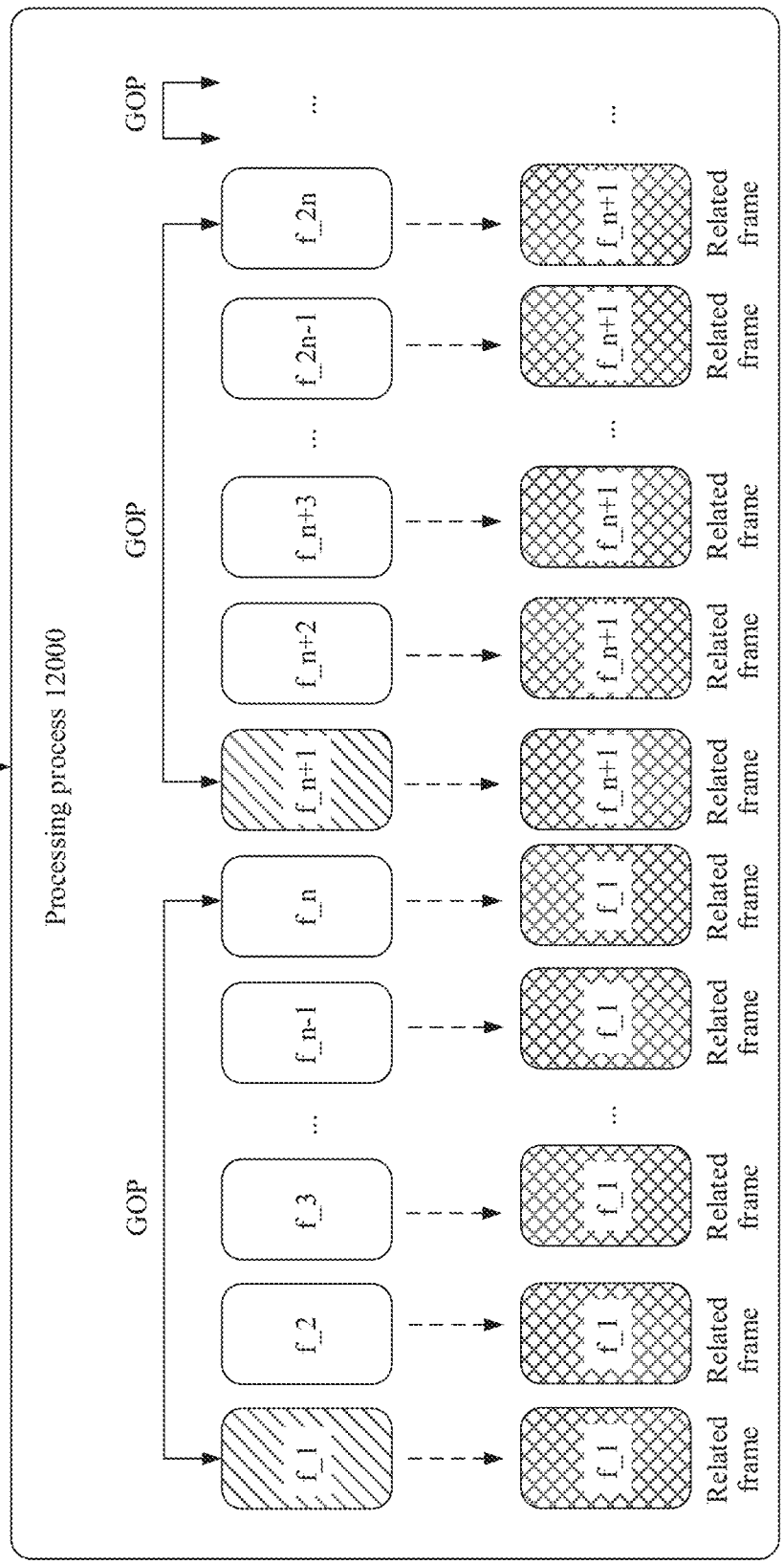

With reference to FIG. 7A to FIG. 7C, the following describes step 107 to step 108 in the embodiment shown in FIG. 4 by using a specific example, to be specific, describes a processing process of texture transfer on a receiving device side.

FIG. 7A to FIG. 7C show a schematic diagram of a processing process of texture transfer according to an embodiment of this application. As shown in FIG. 7A to FIG. 7C, in this embodiment, the processing process of texture transfer corresponding to the recoding process shown in FIG. 6A-1 to FIG. 6A-3 is described as an example. Refer to a processing process 10000 shown in FIG. 7A. The receiving device may decode a third video 10001 to obtain low-quality video frames and residual blocks of a high-quality related frame of each group of pictures, for example, f_1, f_2, f_3, . . . , f_n, f_1 part (part) 1, f_1 part (part) 2, f_1 part (part) 3, and f_1 part (part) 4, f_n+1, f_n+2, f_n+3, . . . , f_2n, f_n+1 part (part) 1, f_n+1 part (part) 2, f_n+1 part (part) 3, and f_n+1 part (part) 4, and the like, as shown in FIG. 7A. Refer to a processing process 11000 shown in FIG. 7B. The receiving device may obtain the high-quality related frame of each group of pictures based on the residual blocks of the high-quality related frame of the group of pictures, for example, obtain f_1 based on f_1 part (part) 1, f_1 part (part) 2, f_1 part (part) 3, and f_1 part (part) 4. Refer to a processing process 12000 shown in FIG. 7C. The receiving device may copy the high-quality related frame of each group of pictures, so that each low-quality video frame has a corresponding high-quality related frame, and the high-quality related frame is used as a reference image of the low-quality video frame. Texture transfer super-resolution processing is performed on each low-quality video frame based on the reference image of the low-quality video frame to obtain a super-resolution video frame, so as to obtain a super-resolution video.

Figure 8A:
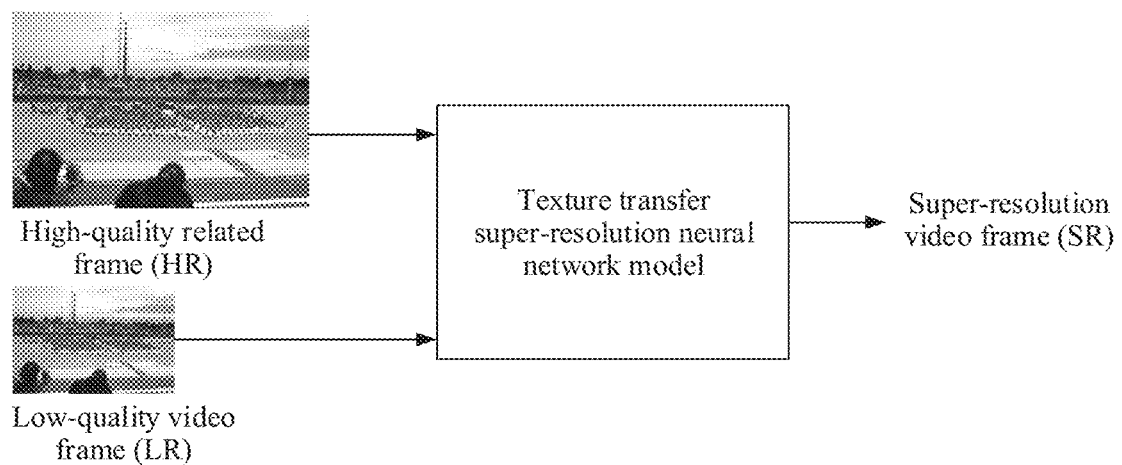
FIG. 8A is a schematic diagram of texture transfer processing according to an embodiment of this application.

A low-quality video frame and a high-quality related frame corresponding to the low-quality video frame are used as an example to describe texture transfer super-resolution processing performed by using a neural network model. FIG. 8A is a schematic diagram of texture transfer processing according to an embodiment of this application. As shown in FIG. 8A, a low-quality video frame (LR) and a high-quality related frame (HR) corresponding to the low-quality video frame (LR) are input into a texture transfer super-resolution neural network model, to output a super-resolution video frame (SR) corresponding to the low-quality video frame.

The texture transfer super-resolution neural network model is obtained by training a neural network model by using low-quality video frames and high-quality video frames, and the texture transfer super-resolution neural network model transfers texture feature information of the high-quality video frames to the low-quality video frames and performs super-resolution processing on the low-quality video frames.

It should be noted that a quantity of layers and a connection relationship of the texture transfer super-resolution neural network model are not limited in this embodiment of this application.

Figure 8B:
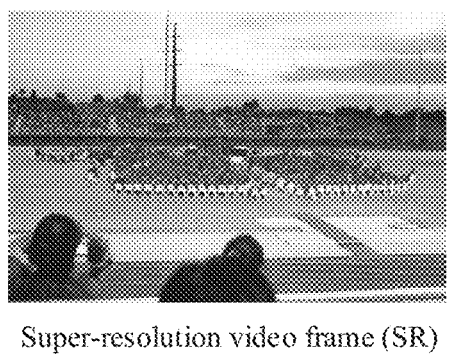
FIG. 8B is a schematic diagram of an output result of texture transfer processing according to an embodiment of this application.

FIG. 8B is a schematic diagram of an output result of texture transfer processing according to an embodiment of this application. As shown in FIG. 8B, a super-resolution video frame (SR) may be output after a low-quality video frame (LR) passes through the texture transfer super-resolution neural network model. It can be learned from FIG. 8B that image quality and resolution of a video frame can be effectively improved through processing performed by using the texture transfer super-resolution neural network model in this embodiment of this application.

Based on a same inventive concept as the foregoing method, an embodiment of this application further provides a video transmission apparatus. The video transmission apparatus may be applied to a video encoder and decoder.

Figure 9:
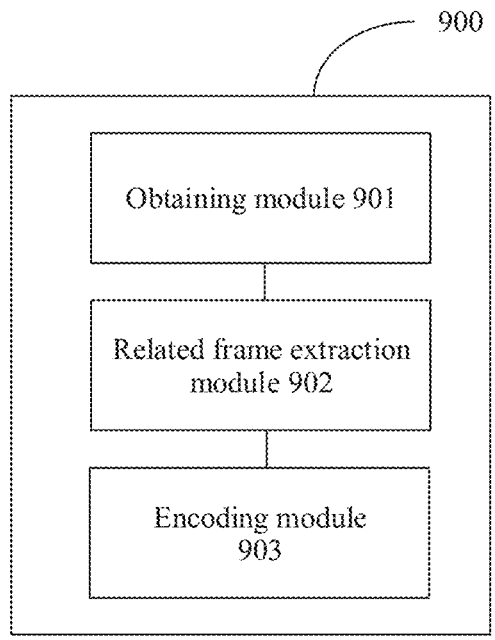
FIG. 9 is a schematic diagram of a structure of a video transmission apparatus according to an embodiment of this application.

FIG. 9 is a schematic diagram of a structure of a video transmission apparatus according to an embodiment of this application. As shown in FIG. 9, the video transmission apparatus 900 includes an obtaining module 901, a related frame extraction module 902, and an encoding module 903. The obtaining module 901 is configured to obtain a first video and a second video, where the first video and the second video have same content, and image quality of the first video is lower than image quality of the second video. The related frame extraction module 902 is configured to obtain M first video frames and identifier information of N target frames based on the first video, where the target frames are video frames in the first video frames, M and N are any positive integers, and M is greater than N. The related frame extraction module 902 is further configured to obtain, from the second video based on the identifier information of the N target frames, related frames corresponding to the N target frames, where the target frames and the related frames have same identifier information but different image quality. The encoding module 903 is configured to recode the M first video frames and the N related frames to obtain a third video, where the third video is transmitted to a receiving device, and a data volume of the third video is less than a data volume of the second video.

In some embodiments, the encoding module 903 is configured to set each related frame of the N related frames at a tail of a plurality of first video frames associated with the related frame for encoding, where the plurality of first video frames associated with the related frame include a plurality of first video frames associated with a target frame corresponding to the related frame.

In some embodiments, the related frame extraction module 902 is configured to decode the first video to obtain the M first video frames, where the M first video frames include K groups of pictures, and K is less than M; and extract the identifier information of the N target frames from the M first video frames. Each group of pictures in the K groups of pictures includes at least one target frame, or a plurality of groups of pictures in the K groups of pictures include one target frame.

In some embodiments, the plurality of first video frames associated with the target frame corresponding to the related frame include a first video frame of at least one group of pictures corresponding to the target frame.

In some embodiments, the encoding module 903 is configured to determine, based on the N related frames and the target frame corresponding to the related frame, a residual block corresponding to the related frame; and set the residual block corresponding to the related frame of the N related frames at the tail of the plurality of first video frames associated with the related frame.

In some embodiments, the encoding module 903 is configured to perform interpolation amplification on the target frame corresponding to the related frame to obtain an enlarged image of the target frame, where resolution of the enlarged image is the same as resolution of the related frame; and perform residual processing on the related frame and the enlarged image of the related frame, to determine the residual block corresponding to the related frame.

In some embodiments, the target frame includes at least one of the following: an I frame, a P frame, or a B frame.

It should be noted that the obtaining module 901, the related frame extraction module 902, and the encoding module 903 may be applied to an encoding process before a transmit end transmits a video. The video transmission apparatus 900 may also be referred to as a video encoding apparatus 900.

It should be further noted that, for specific implementation processes of the obtaining module 901, the related frame extraction module 902, and the encoding module 903, reference may be made to the detailed descriptions in the foregoing method embodiments. For brevity of the specification, details are not described herein again.

Based on a same inventive concept as the foregoing method, an embodiment of this application provides a video encoder. The video encoder is configured to recode a video, and includes the video transmission apparatus in the foregoing one or more embodiments, where the video transmission apparatus is configured to recode a first video and a second video to generate a third video.

The video encoder may be a video encoder of a sending device.

Based on a same inventive concept as the foregoing method, an embodiment of this application provides a video transmission device. The device includes a memory, configured to store a video or computer-executable instructions; and a video encoder, configured to obtain a first video and a second video, where the first video and the second video have same content, and image quality of the first video is lower than image quality of the second video; obtain M first video frames and identifier information of N target frames based on the first video, where the target frames are video frames in the first video frames. M and N are any positive integers, and M is greater than N; obtain, from the second video based on the identifier information of the N target frames, related frames corresponding to the N target frames, where the target frames and the related frames have same identifier information but different image quality; and recode the M first video frames and the N related frames to obtain a third video, where the third video is transmitted to a receiving device, and a data volume of the third video is less than a data volume of the second video.

Alternatively, the apparatus 900 may be configured as a general-purpose processing system, for example, is generally referred to as a chip. The chip may include one or more processors that provide a processing function. The one or more processors are configured to complete processing functions of the obtaining module 901, the related frame extraction module 902, and the encoding module 903. The chip may further include an input/output interface, a pin, a circuit, or the like. The input/output interface may be configured to be responsible for information exchange between the chip and the outside. For example, the input/output interface may output the third video to another module outside the chip for processing. The processor may execute computer-executable instructions stored in a storage module, to implement functions of the sending device in the foregoing method embodiments. In an example, the chip optionally includes a storage unit, for example, a register or a cache. In some embodiments, the storage unit may alternatively be a storage unit that is in the receiving device and that is located outside the chip, for example, a read-only memory (read-only memory, ROM for short), another type of static storage device that can store static information and instructions, or a random access memory (random access memory, RAM for short).

Figure 10:
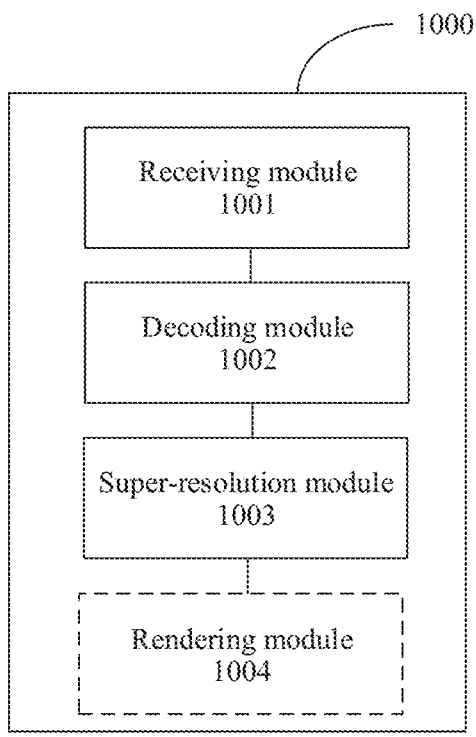
FIG. 10 is a schematic diagram of a structure of a video transmission apparatus according to an embodiment of this application.

FIG. 10 is a schematic diagram of a structure of a video transmission apparatus according to an embodiment of this application. As shown in FIG. 10, the video transmission apparatus 1000 includes a receiving module 1001, a decoding module 1002, and a super-resolution module 1003. The receiving module 1001 is configured to receive a third video. The decoding module 1002 is configured to obtain M first video frames and N related frames based on the third video, where M and N are any positive integers, M is greater than N, image quality of the first video frames is lower than image quality of the related frames, and the related frames correspond to target frames in the first video frames. The decoding module 1002 is further configured to determine a reference image of each first video frame based on the N related frames. The super-resolution module 1003 is configured to perform texture transfer super-resolution processing on each first video frame based on the reference image of the first video frame, to obtain a super-resolution video.

In some embodiments, the super-resolution video includes a plurality of super-resolution video frames. The super-resolution module 1003 is configured to input each first video frame and the reference image of the first video frame into a texture transfer super-resolution neural network model, to output the super-resolution video frames corresponding to the first video frames. The texture transfer super-resolution neural network model is obtained by training a neural network model by using the first video frames and second video frames, the texture transfer super-resolution neural network model transfers texture feature information of the second video frames to the first video frames and performs super-resolution processing on the first video frames, and image quality of the second video frames is higher than that of the first video frames.

In some embodiments, the M first video frames include K groups of pictures, where K is less than M. The decoding module 1002 is configured to use a related frame of each group of pictures as a reference image of each first video frame in the group of pictures. The related frame of the group of pictures is a related frame corresponding to a target frame in the group of pictures.

In some embodiments, the apparatus further includes a rendering module 1004, configured to render the super-resolution video, and display a rendered super-resolution video.

Based on a same inventive concept as the foregoing method, an embodiment of this application provides a video decoder. The video decoder is configured to decode a video, and includes the video transmission apparatus in the foregoing one or more embodiments, where the video transmission apparatus is configured to decode a third video, and perform texture transfer super-resolution processing to obtain a super-resolution video.

The video decoder may be a video decoder of a receiving device.

Based on a same inventive concept as the foregoing method, an embodiment of this application provides a video transmission device. The device includes a memory, configured to store a video or computer-executable instructions: and a video decoder, configured to obtain M first video frames and N related frames based on the third video, where M and N are any positive integers, M is greater than N, image quality of the first video frames is lower than image quality of the related frames, and the related frames correspond to target frames in the first video frames: determine a reference image of each first video frame based on the N related frames: and perform texture transfer super-resolution processing on each first video frame based on the reference image of the first video frame, to obtain a super-resolution video.

Based on a same inventive concept as the foregoing method, an embodiment of this application provides an encoding and decoding device, including a non-volatile memory and a processor that are coupled to each other. The processor invokes program code stored in the memory to perform some or all of the steps of the video transmission method in the foregoing one or more embodiments.

Based on a same inventive concept as the foregoing method, an embodiment of this application provides a computer-readable storage medium. The computer-readable storage medium stores program code, and the program code includes instructions used to perform some or all of the steps of the video transmission method in the foregoing one or more embodiments.

Based on a same inventive concept as the foregoing method, an embodiment of this application provides a computer program product. When the computer program product is run on a computer, the computer is enabled to perform some or all of the steps of the video transmission method in the foregoing one or more embodiments.

A person skilled in the art can understand that functions described with reference to various illustrative logical blocks, modules, and algorithm steps disclosed in this specification may be implemented by hardware, software, firmware, or any combination thereof. If implemented by software, the functions described in the various illustrative logical blocks, modules, and steps may be stored or transmitted on a computer-readable medium as one or more instructions or code and executed by a hardware-based processing unit. The computer-readable medium may include a computer-readable storage medium, which corresponds to a tangible medium such as a data storage medium, or a communication medium including any medium that facilitates transfer of a computer program from one place to another (for example, according to a communication protocol). In this manner, the computer-readable medium may generally correspond to a non-transitory tangible computer-readable storage medium (1), or a communication medium (2) such as a signal or a carrier. The data storage medium may be any available medium that can be accessed by one or more computers or one or more processors to retrieve instructions, code, and/or data structures for implementing the technologies described in this application. The computer program product may include a computer-readable medium.

By way of example and not limitation, such computer-readable storage medium may include a RAM, a ROM, an EEPROM, a CD-ROM or another optical disc storage apparatus, a magnetic disk storage apparatus or another magnetic storage apparatus, a flash memory, or any other medium that can store desired program code in a form of instructions or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include a connection, a carrier, a signal, or another transitory medium, but are actually specific to a non-transitory tangible storage medium. Disks and optical discs used in this specification include a compact disc (CD), a laser disc, an optical disc, a digital versatile disc (DVD), and a Blu-ray disc. The disks usually reproduce data magnetically, and the optical discs reproduce data optically by using lasers. A combination of the foregoing items should also be included in the scope of the computer-readable medium.

Instructions may be executed by one or more processors such as one or more digital signal processors (DSP), a general-purpose microprocessor, an application-specific integrated circuit (ASIC), a field programmable logic array (FPGA), or another equivalent integrated or discrete logic circuit. Therefore, the term "processor" used in this specification may refer to any one of the foregoing structures or any other structure suitable for implementing the technologies described in this specification. In addition, in some aspects, the functions described in the various illustrative logical blocks, modules, and steps described in this specification may be provided in dedicated hardware and/or software modules configured for encoding and decoding, or may be incorporated into a combined encoder and decoder. In addition, the techniques may be fully implemented in one or more circuits or logic elements.

The technologies of this application may be implemented in various apparatuses or devices, including a wireless handset, an integrated circuit (IC), or a group of ICs (for example, a chip set). Various components, modules, or units are described in this application to emphasize functional aspects of the apparatuses configured to perform the disclosed technologies, but are not necessarily implemented by different hardware units. Actually, as described above, various units may be combined in an encoder and decoder hardware unit in combination with appropriate software and/or firmware, or may be provided by interoperable hardware units (including one or more processors described above).

In the foregoing embodiments, descriptions of embodiments have respective focuses. For a part that is not described in detail in an embodiment, refer to related descriptions in other embodiments.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video transmission method, comprising:
obtaining a first video and a second video, wherein the first video and the second video have same content, and image quality of the first video is relatively lower than image quality of the second video;
obtaining M first video frames and identifier information of N target frames based on the first video, wherein the target frames are video frames in the first video frames, M and N are any positive integers, and M is greater than N;
obtaining, from the second video based on the identifier information of the N target frames, related frames corresponding to the N target frames, wherein the target frames and the related frames have same identifier information but different image quality; and recoding the M first video frames and the N related frames to obtain a third video, wherein the third video is transmitted to a receiving device, and a data volume of the third video is less than a data volume of the second video, wherein the recoding comprises:

performing interpolation amplification on a target frame corresponding to a related frame of the N related frames to obtain an enlarged image of the target frame, wherein resolution of the enlarged image is the same as resolution of the related frame; and performing residual processing on the related frame and the enlarged image of the target frame to determine a residual block corresponding to the related frame.

2. The method according to claim 1, wherein the recoding the M first video frames and the N related frames comprises:

setting the related frame of the N related frames at a tail of a plurality of first video frames associated with the related frame for encoding, wherein the plurality of first video frames associated with the related frame comprise a plurality of first video frames associated with the target frame corresponding to the related frame.

3. The method according to claim 2, wherein the obtaining M first video frames and identifier information of N target frames based on the first video comprises:

decoding the first video to obtain the M first video frames, wherein the M first video frames comprise K groups of pictures, and K is less than M; and extracting the identifier information of the N target frames from the M first video frames, wherein:

each group of pictures in the K groups of pictures comprises at least one target frame; or a plurality of groups of pictures in the K groups of pictures comprise one target frame.

4. The method according to claim 3, wherein the plurality of first video frames associated with the target frame corresponding to the related frame comprise a first video frame of at least one group of pictures corresponding to the target frame.

5. The method according to claim 2, wherein the setting the related frame of the N related frames at a tail of a plurality of first video frames associated with the related frame comprises:

determining, based on the N related frames and the target frame corresponding to the related frame, the residual block corresponding to the related frame; and setting the residual block corresponding to the related frame of the N related frames at the tail of the plurality of first video frames associated with the related frame.

6. The method according to claim 1, wherein the target frame comprises at least one of the following: an I frame, a P frame, or a B frame.

7. A video transmission apparatus, comprising at least one processor coupled to a non-transitory memory storing instructions for execution by the at least one processor to perform operations comprising:

obtaining a first video and a second video, wherein the first video and the second video have same content, and image quality of the first video is relatively lower than image quality of the second video;

obtaining M first video frames and identifier information of N target frames based on the first video, wherein the target frames are video frames in the first video frames, M and N are any positive integers, and M is greater than N;

obtaining, from the second video based on the identifier information of the N target frames, related frames corresponding to the N target frames, wherein the target frames and the related frames have same identifier information but different image quality; and recoding the M first video frames and the N related frames to obtain a third video, wherein the third video is transmitted to a receiving device, and a data volume of the third video is less than a data volume of the second video, wherein the recoding comprises:

performing interpolation amplification on a target frame corresponding to a related frame of the N related frames to obtain an enlarged image of the target frame, wherein resolution of the enlarged image is the same as resolution of the related frame; and performing residual processing on the related frame and the enlarged image of the target frame to determine a residual block corresponding to the related frame.

8. The apparatus according to claim 7, wherein the recoding the M first video frames and the N related frames comprises:

setting the related frame of the N related frames at a tail of a plurality of first video frames associated with the related frame for encoding, wherein the plurality of first video frames associated with the related frame comprise a plurality of first video frames associated with the target frame corresponding to the related frame.

9. The apparatus according to claim 8, wherein the obtaining M first video frames and identifier information of N target frames based on the first video comprises:

decoding the first video to obtain the M first video frames, wherein the M first video frames comprise K groups of pictures, and K is less than M; and extracting the identifier information of the N target frames from the M first video frames, wherein:

each group of pictures in the K groups of pictures comprises at least one target frame; or a plurality of groups of pictures in the K groups of pictures comprise one target frame.

10. The apparatus according to claim 9, wherein the plurality of first video frames associated with the target frame corresponding to the related frame comprise a first video frame of at least one group of pictures corresponding to the target frame.

11. The apparatus according to claim 9, wherein the setting the related frame of the N related frames at a tail of a plurality of first video frames associated with the related frame comprises:

determining, based on the N related frames and the target frame corresponding to the related frame, the residual block corresponding to the related frame; and setting the residual block corresponding to the related frame of the N related frames at the tail of the plurality of first video frames associated with the related frame.

12. The apparatus according to claim 7, wherein the target frame comprises at least one of the following: an I frame, a P frame, or a B frame.

13. A video encoding and decoding device, comprising an encoder, wherein the encoder is configured to perform a method comprising:

obtaining a first video and a second video, wherein the first video and the second video have same content, and image quality of the first video is relatively lower than image quality of the second video;

obtaining M first video frames and identifier information of N target frames based on the first video, wherein the target frames are video frames in the first video frames, M and N are any positive integers, and M is greater than N;

obtaining, from the second video based on the identifier information of the N target frames, related frames corresponding to the N target frames, wherein the target frames and the related frames have same identifier information but different image quality; and recoding the M first video frames and the N related frames to obtain a third video, wherein the third video is transmitted to a receiving device, and a data volume of the third video is less than a data volume of the second video, wherein the recoding comprises:

performing interpolation amplification on a target frame corresponding to a related frame of the N related frames to obtain an enlarged image of the target frame, wherein resolution of the enlarged image is the same as resolution of the related frame; and performing residual processing on the related frame and the enlarged image of the target frame to determine a residual block corresponding to the related frame.

14. The video encoding and decoding device of claim 13, wherein the recoding the M first video frames and the N related frames comprises:

setting the related frame of the N related frames at a tail of a plurality of first video frames associated with the related frame for encoding, wherein the plurality of first video frames associated with the related frame comprise a plurality of first video frames associated with the target frame corresponding to the related frame.

15. The video encoding and decoding device of claim 14, wherein the obtaining M first video frames and identifier information of N target frames based on the first video comprises:

decoding the first video to obtain the M first video frames, wherein the M first video frames comprise K groups of pictures, and K is less than M; and extracting the identifier information of the N target frames from the M first video frames, wherein:

each group of pictures in the K groups of pictures comprises at least one target frame; or a plurality of groups of pictures in the K groups of pictures comprise one target frame.

16. The video encoding and decoding device of claim 15, wherein the plurality of first video frames associated with the target frame corresponding to the related frame comprise a first video frame of at least one group of pictures corresponding to the target frame.

17. The video encoding and decoding device of claim 14, wherein the setting each related frame of the N related frames at a tail of a plurality of first video frames associated with the related frame comprises:

determining, based on the N related frames and the target frame corresponding to the related frame, the residual block corresponding to the related frame; and setting the residual block corresponding to the related frame of the N related frames at the tail of the plurality of first video frames associated with the related frame.

18. The video encoding and decoding device of claim 13, wherein the target frame comprises at least one of the following: an I frame, a P frame, or a B frame.

* * * * *

UNITED STATES PATENT AND TRADEMARK OFFICE
CERTIFICATE OF CORRECTION

| | | |
|---|---|---|
| PATENT NO. | : 12,389,010 B2 | Page 1 of 1 |
| APPLICATION NO. | : 18/070220 | |
| DATED | : August 12, 2025 | |
| INVENTOR(S) | : Long Sun and Wei Lu | |

It is certified that error appears in the above-identified patent and that said Letters Patent is hereby corrected as shown below:

On the Title Page

Item (57), Column 2 (Abstract), In Line 1, Delete "disclosed" and insert -- discloses --.

Signed and Sealed this
Twenty-third Day of December, 2025

John A. Squires
*Director of the United States Patent and Trademark Office*